(12) United States Patent
Ghahramani

(10) Patent No.: US 6,259,373 B1
(45) Date of Patent: Jul. 10, 2001

(54) MULTIPLE HAZARD MARKER SYSTEM, COMPONENTS THEREFOR AND METHODS OF MAKING THE SAME

(76) Inventor: Bahador Ghahramani, 940-C Meriweather St., Rolla, MO (US) 65409

( * ) Notice: Subject to any disclaimer, the term of this patent is extended or adjusted under 35 U.S.C. 154(b) by 0 days.

(21) Appl. No.: 09/306,171

(22) Filed: May 6, 1999

Related U.S. Application Data

(60) Provisional application No. 60/085,159, filed on May 12, 1998.

(51) Int. Cl.$^7$ .................................................. G08B 5/00
(52) U.S. Cl. ........................................ 340/815.4; 340/632
(58) Field of Search ........................... 340/815.4, 815.42, 340/815.43, 815.65, 815.73, 815.75, 815.76, 632, 562, 573.4, 618, 568, 539, 540

(56) References Cited

U.S. PATENT DOCUMENTS

| | | | |
|---|---|---|---|
| D. 389,078 | 1/1998 | Freeman et al. | D10/114 |
| 3,933,118 | 1/1976 | Lyons et al. | 116/63 P |
| 4,552,089 | 11/1985 | Mahoney | 116/63 P |
| 4,747,515 | 5/1988 | Kasher et al. | 221/116 |
| 4,901,644 | * 2/1990 | Nevins et al. | 102/293 |
| 4,969,398 | 11/1990 | Lundwall | 102/293 |
| 5,069,136 | 12/1991 | Axelson et al. | 102/425 |
| 5,305,705 | 4/1994 | Gagliano | 116/63 P |
| 5,450,058 | * 9/1995 | Collier | 340/473 |
| 5,462,004 | 10/1995 | Mc Glothin | 116/63 R |
| 5,592,898 | 1/1997 | Korpl | 116/209 |
| 5,731,895 | 3/1998 | Owczarzak et al. | 359/515 |
| 5,825,298 | * 10/1998 | Walter | 340/10.51 X |

OTHER PUBLICATIONS

Chemical Warfare Agent and High Explosive Identification by Spectroscopy of Neutron–Induced Gamma Rays, IEEE Transactions on Nuclear Science, vol. 39, No. 5, Caffrey, et al., Oct. 1992.

Biological Agents Detector using a Surface Transverse Wave Resonator: Preliminary Report 1994 IEEE MTT–S Digest, TU4D–4, McGowan, et al.

Yu–Chu Yang, Chemical Reactions for Neutralising Chemical Warfare Agents, Chemistry & Industry 1 May 1995, vol. 8.

Joseph J. Carr, Sensors and Circuits, Prentice–Hall, Englewood Cliffs, NJ, 1993.

Earp, et al., Ultra Wideband Ground Penetrating Radar for Detection of Buried Metallic Mines IEEE AES Systems, vol. 11, No. 9, Sep. 1996.

Andre G. Lareau, Flight Performance of an Airborne Minefield Detection and Reconnaissance System, Photogrammetric Engineering & Remote Sensing, vol. 57, No. 2, Feb. 1991.

* cited by examiner

Primary Examiner—Thomas Mullen
(74) Attorney, Agent, or Firm—Richard L. Marsh

(57) ABSTRACT

A multiple hazard marker system consists of at least one multiple hazard marker, a deployment vehicle, a deployment surface and a deployment device for deploying the multiple hazard marker. The multiple hazard marker comprises a ground engaging portion, an upper portion and a central portion. The multiple hazard marker will remain erect when deployed and includes a visible marker for marking a position upon a field where deployed. The multiple hazard marker further has collapsible elements that expand upon deployment, a signaling device, a receiver for activating the signaling device and transmitter associated with the signaling device. The deployment device for deploying the multiple hazard marker collapses and retains the multiple hazard marker in the deployment device until a releasing mechanism releases the multiple hazard marker from the deployment device at deployment.

20 Claims, 13 Drawing Sheets

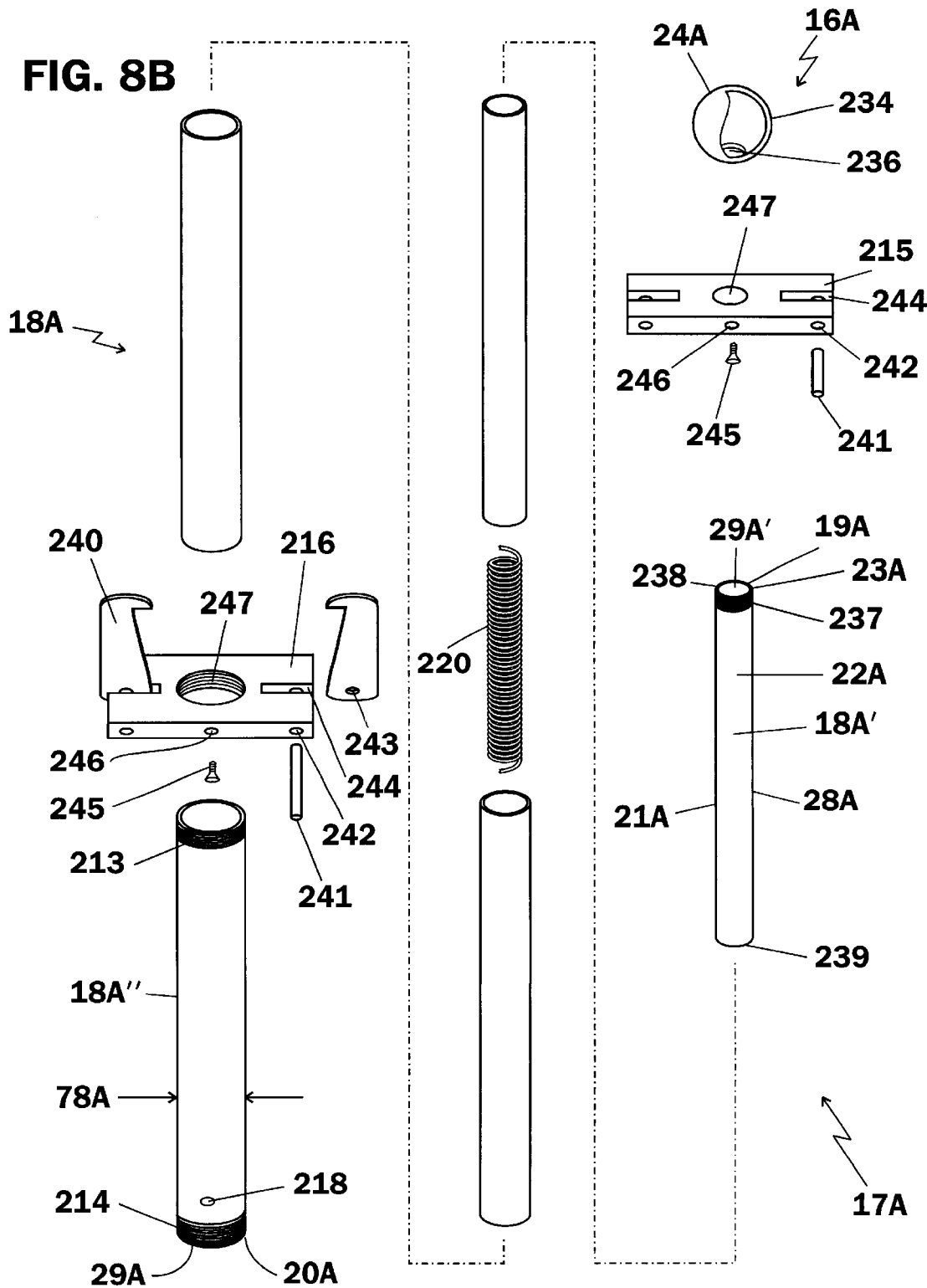

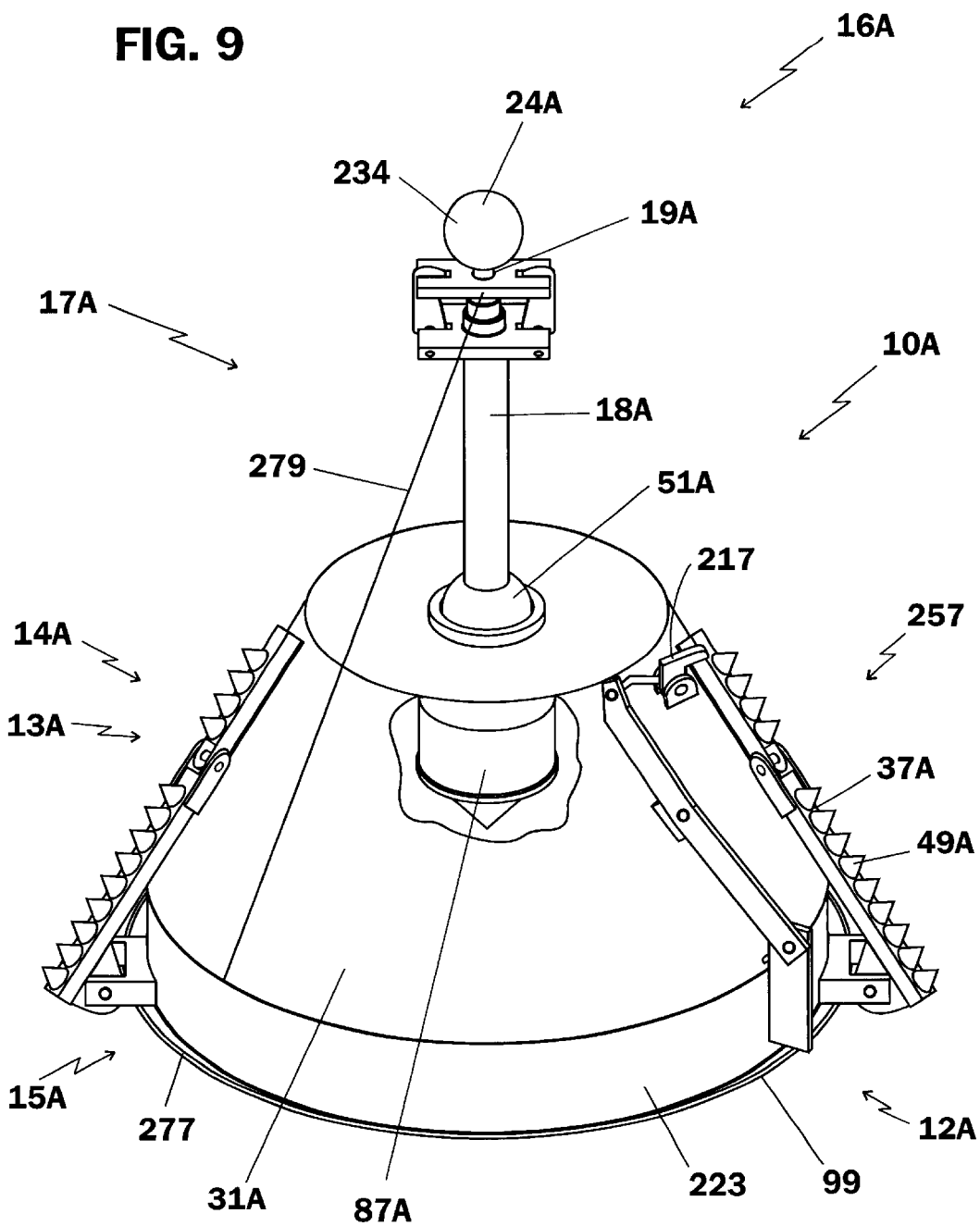

MULTIPLE HAZARD MARKER SYSTEM, COMPONENTS THEREFOR AND METHODS OF MAKING THE SAME

CROSS REFERENCE TO RELATED APPLICATION

This application is a non-provisional application for United States Letters Patent under 35 U.S.C. 111 (a) of provisional application Ser. No. 60/085,159, filed May 12, 1998.

GOVERNMENT RIGHTS

The U.S. Government has a paid-up license in this invention and the right in limited circumstances to require the patent owner to license others on reasonable terms as provided for by the terms of Contract Number DABT31-97-C0022 awarded by the Department of the Army.

BACKGROUND OF THE INVENTION

1. Field of the Invention

This invention relates to a highly visible, easily deployed multiple hazard marker and multiple hazard marker system for breach lanes through a minefield, biohazard warning, chemical warning, buried power and fluid transmission lines, construction zones, surveying sites, flood warning, fire zone warnings, blasting zones and the like.

2. Prior Art Statement

Previous attempts to provide a marker for breach lanes through a minefield have resulted in at least two such markers known as the Air Implacement Marker (AIM) and the Impulse Cartridge Method (ICM). The ICM consists of a barrel assembly for accepting the pole like marker and a shell chamber for receiving an explosive shell. The pole like marker is adapted to be driven into the substrate to be marked, such as the ground, by firing the explosive shell within the chamber creating a driving force behind a top end of the pole like marker. Although suitable for earthen emplacement, utilization upon harder surfaces such as roadways is impossible. Furthermore, emplacement from the air, such as by helicopter, cannot be effected. Similar disadvantages exist with the Air Implacement Marker which is driven into the substrate to be marked by a short duration blast of a highly compressible fluid such as air. The AIM are small diameter fiberglass poles having a reflective surface upon a portion of the length of the marker pole. These poles are subject to easy breakage during the emplacement process as the marker pole bends upon impact with the substrate when fired from a moving vehicle and fractures along stress lines within the fiberglass pole. Therefore, a significant need exists for a marker system employing markers which are adapted to stand upright upon contact with the substrate to be marked and which may be deployed from a moving vehicle.

It is known to provide a single hazard marker such as a road safety marker having three legs bound together at the top thereof and at another location thereon with a lighting housing atop the three legs. For instance, see the Design U.S. Pat. No. 389,078 issued on Jan. 13, 1998 to Freeman, et al.

Additionally, it is also known to provide a single hazard marker such as an emergency warning flag system to mark areas for use solely by emergency vehicles comprising a flag pole with a flag secured to the upper end thereof, a base unit and an attachment means extending downwardly from the base unit for securement to a ground surface. For instance, see the U.S. Pat. No. 5,462,004 issued on Oct. 31, 1995 to Clayton E. McGlothin.

It is also known to provide a single hazard marker such as a reflective element comprising a body member having optically reflective means on the outer surface thereof for attachment to a fence post. For instance, see the U.S. Pat. No. 5,731,895 issued on Mar. 24, 1998 to Owczarzak, et al.

It is also known to provide a single hazard marker such as a traffic signal marker comprising an unbreakable elongated light transmitting tube containing two manually miscible chemical reactants affixed to a base member comprising first and second support members to maintain the light in an upright position. For instance, see the U.S. Pat. No. 3,933,118 issued on Jan. 20, 1976 to Lyons, et al.

It is yet known to provide a single hazard marker such as a collapsible road hazard marker comprising a resilient spiral arm defining a collapsible body having a generally conical shape having an apex with a latch member mounted to the collapsible body at the apex and a base member for receiving the latch member. For instance, see the U.S. Pat. No. 5,305,705 issued on Apr. 26, 1994 to Greg R. Gagliano.

The prior art describes a single hazard marker system such as a reusable road hazard warning system comprising an elongated flexible carrier having a plurality of road warning elements attached thereto and normally maintained retracted when the carrier is disposed in a storage mode, the warning elements being erectable when the carrier is payed out upon a road surface. For instance, see the U.S. Pat. No. 4,522,089 issued on Nov. 12, 1985 to Thomas P. Mahoney.

Still known is to provide a single hazard marker such as an apparatus for marking the post-detonation safe area within an explosive terrain, the marking apparatus assembly including a housing means and adapted for delivery to the area by a remotely launched device, a means for ejecting the marking apparatus from the launched device, a plurality of marking means having means for extending associated therewith within the housing means and an initiating means for initiating the extension means by an external pressure source. For instance, see the U.S. Pat. No. 4,969,398 issued on Nov. 13, 1990 to Neal M. Lundwall.

It is further known to provide a two-stage release self-righting mechanism for use in erecting a load from a side position to an upright position comprising an array of spring legs for attachment to the load and a pair of primary and secondary releasable holder assemblies. For instance, see the U.S. Pat. No. 5,069,136 issued on Dec. 3, 1991 to Axelson, et al.

Another known single hazard marker is a deployable lane marker comprising a base, an illuminator and a frangible bracket releasably holding the illuminator in a lowered position on the base. For instance, see the U.S. Pat. No. 5,592,898 issued on Jan. 14, 1997 to John G. Korpl.

It is also known to provide an apparatus for deploying single hazard markers from a self-propelled land vehicle comprising at least one vertical shaft adapted to hold a stack of foldable markers in a folded position, a delivery gate at the lower end thereof, a means associated with the shaft for biasing the stack of markers toward the delivery gate, means associated with the gate for sequentially releasing markers. For instance, see the U.S. Pat. No. 4,747,515 issued on May 31, 1988 to Kasher, et al.

It is further known to identify certain hazards by spectroscopy. For instance, see the article by Caffrey, et al., "Chemical Warfare Agent and High Explosive Identification by Spectroscopy of Neutron-Induced Gamma Rays", IEEE Transactions on Nuclear Science, Vol. 39, No. 5.

Also known is to detect certain biological hazards using a surface transverse wave resonator. For instance, see the article by McGowan, et al., "Biological Agent Detector using a Surface Transverse Wave Resonator Preliminary Report", 1994 IEEE MTT-S Digest, TU4D-4.

It is further known to neutralize CW agents. For instance see the article by Yu-Chu Yang,"Chemical Reactions for Neutralising Chemical Warfare Agents" published in the 1 May 1995 issue of Chemistry & Industry, Vol. 8, pp 334–337.

Known sensors and circuits are described in the book by Joseph J. Carr, Sensors and Circuits published by Prentice-Hall, Englewood Cliffs, N.J., 1993

It is known to detect mines in a mine field with electronic means. For instance, see the article by Earp, et al.,"Ultra Wideband Ground Penetrating Radar for Detection of Buried Metallic Mines", appearing in IEEE AES Systems, September 1996, Vol. 11, No.9.

Finally, it is known to detect mines in a mine field by an airborne minefield detection and reconnaissance system. For instance, see the article by Andre G. Lareau, "Flight Performance of an Airborne Minefield Detection and Reconnaissance System", Photogrammetric Engineering & Remote Sensing, Vol 57, No. 2, Feburary 1991, pp 173–178.

SUMMARY OF THE INVENTION

It is an object of this invention to provide a multiple hazard marking system comprising a deployment vehicle, a deployment surface, a plurality of multiple hazard markers and means to deploy the multiple hazard markers carried by the deployment vehicle, each multiple hazard marker having a means for standing erect upon the deployment surface, a means for visibly marking a location on the deployment surface, a means for visibly signaling the presence of physical hazards, a means for determining the presence of ABC hazards and a means for communicating.

A further object of this invention is to provide a multiple hazard marker system consisting of at least one multiple hazard marker, a deployment vehicle, a communication system, a deployment surface and a means for deploying the multiple hazard marker, the multiple hazard marker comprising a surface engaging portion, an upper portion and a central portion, a means for remaining erect when deployed associated with the surface engaging portion, a means for marking a position upon a field where deployed associated with the upper portion, a means for collapsing or expanding associated with the central portion, a means for signaling, a means for activating associated with the means for signaling and a means for transmitting associated with the means for activating wherein the means for deploying the multiple hazard marker comprises a means for collapsing the multiple hazard marker, a means for retaining the multiple hazard markers contained therein and at least one means for releasing the multiple hazard marker.

Yet another object of this invention is to provide a multiple hazard marking system which may be deployed by aircraft for marking the boundaries of a minefield wherein the mines in the field have been detected by ground penetrating radar or a thermal signature.

It is yet another object of this invention to provide a multiple hazard marker having means to remain erect on an even or uneven surface when deployed, the means to remain erect associated with a surface engaging portion and comprising a plurality of deployable leg elements the leg elements having means for engaging the deployment surface.

It is another object of this invention to provide a multiple hazard marker having a self aligning mounting to align the mast vertically upon deployment and a plurality of deployable leg elements each journeyed in a mounting plate in the central portion and extending therefrom, the leg elements having ground engaging spike like elements associated therewith.

Still another object of this invention is to provide a multiple hazard marker having means for visibly marking a location on the deployment surface that comprises at least one luminous device such as an illuminating means and/or a luminescent or fluorescent material and/or signal flags affixed to a top portion of the multiple hazard marker.

Yet another object of this invention is to provide a multiple hazard marker which is at least five feet in height for easy detection by ground based personnel or vehicles.

It is an object of this invention to provide a multiple hazard marker having spring actuated legs upon deployment from a deployment cartridge.

It is still another object of this invention to provide a multiple hazard marker system having means for communicating including means for receiving radio frequency signals from remote transmitters, the means for communicating receiving information from a station remote from the multiple hazard markers deployed on a field, at least one of the remote transmitters associated with the deployment vehicle.

Additionally, it is an object of this invention to provide a multiple hazard marker having means for signaling the presence of said ABC hazards wherein the means for signaling comprises means for changing the color of a luminous device associated with the multiple hazard marker and/or transmit information to a station remote from the multiple hazard markers deployed on a field.

It is a further object of this invention to provide a multiple hazard marker which can be reprogrammed from a station remote from the multiple hazard markers deployed on a field.

Yet a further object of this invention to provide a multiple hazard marker system wherein a multiple hazard marker of the system has a canister associated with one end of the mast thereof having means which can detect, and/or quantify and/or qualify atomic, biological and/or chemical hazards, the multiple hazard marker further having means for communicating comprising means for electronically transmitting toxicity levels and/or means for visibly signaling the presence of the ABC hazards.

Still a further object of this invention to provide a multiple hazard marker which may be deployed seriatim to mark at least one edge of a lane through a hazardous field from a deployment vehicle such as a military tank moving at a speed of up to fifteen kilometers per hour, the multiple hazard markers being deployed from either side of the tank, the multiple hazard markers standing and remaining erect upon the deployment surface after deployment.

It is another object of this invention to provide a multiple hazard marker system having multiple deployments from an automated, rotary carousel magazine having multiple rows of multiple hazard marker cartridges mounted therein, the carousel having means for rotating, stopping and deploying associated therewith.

Finally, it is an object of this invention to provide a multiple hazard marker which is deployed by gravity from a deployment vehicle.

BRIEF DESCRIPTION OF THE DRAWINGS

FIG. 9 is a perspective view of the preferred multiple hazard marker of this invention shown in the collapsed state for loading into the deployment cartridge of the multiple hazard marking system of FIG. 1.

DESCRIPTION OF THE PREFERRED EMBODIMENTS

Figure 4A:
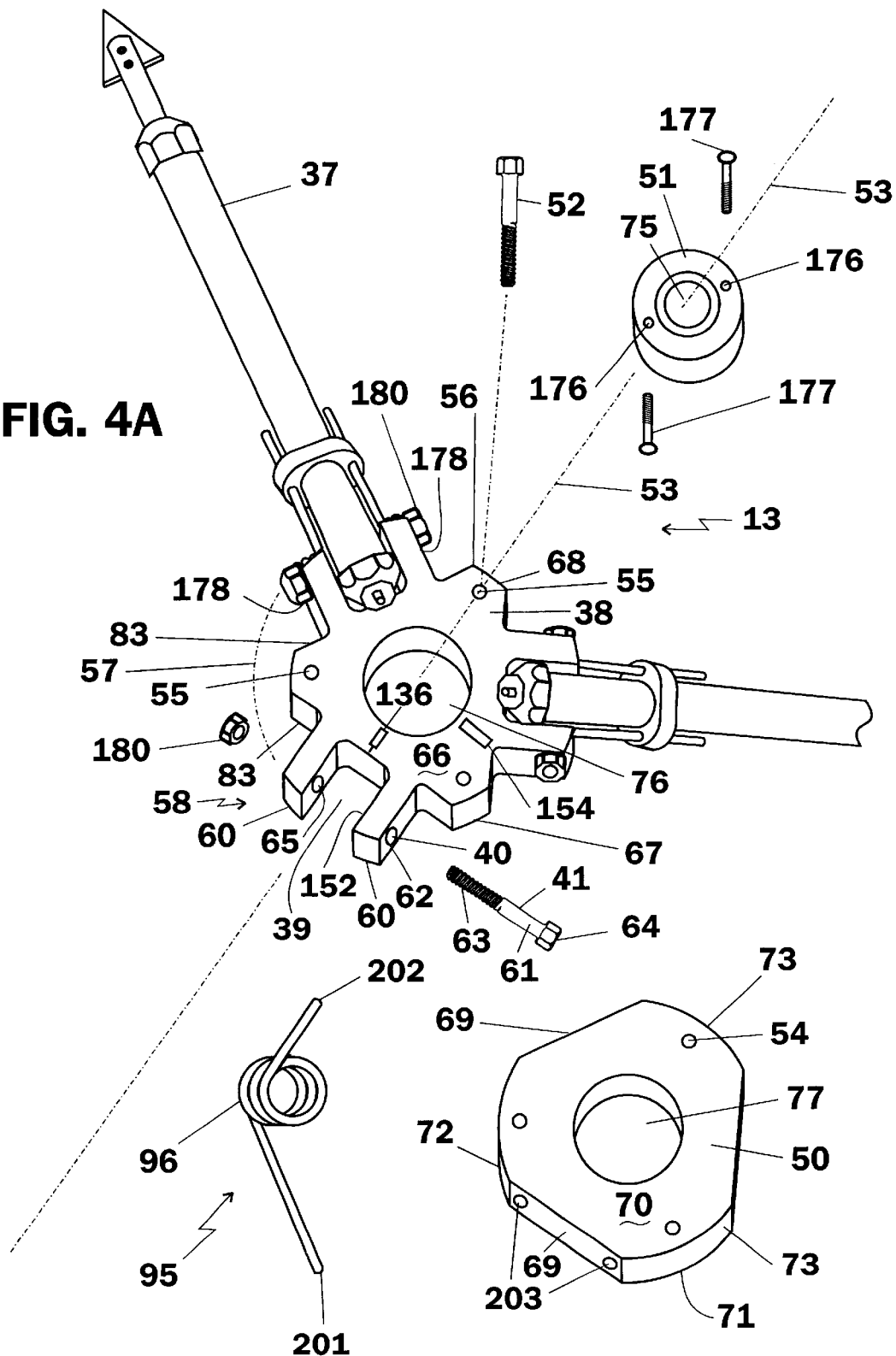
FIG. 4 is an exploded view of the multiple hazard marker of the multiple hazard marking system of FIG.1 having the central portion on sheet 4a, the mast of the multiple hazard marker on sheet 4b and one of the legs on sheet 4c.
Figure 4B:
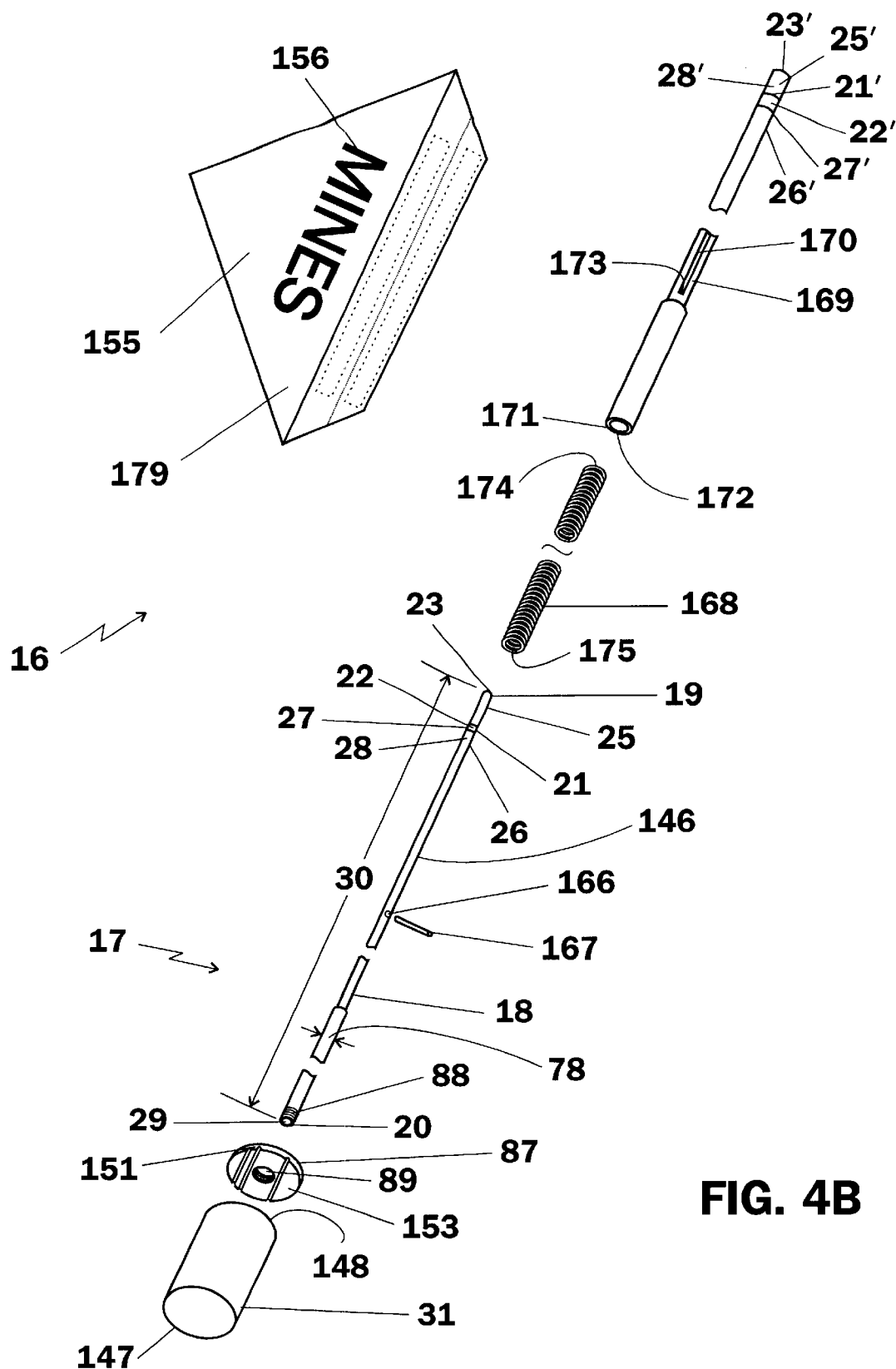
Figure 4C:
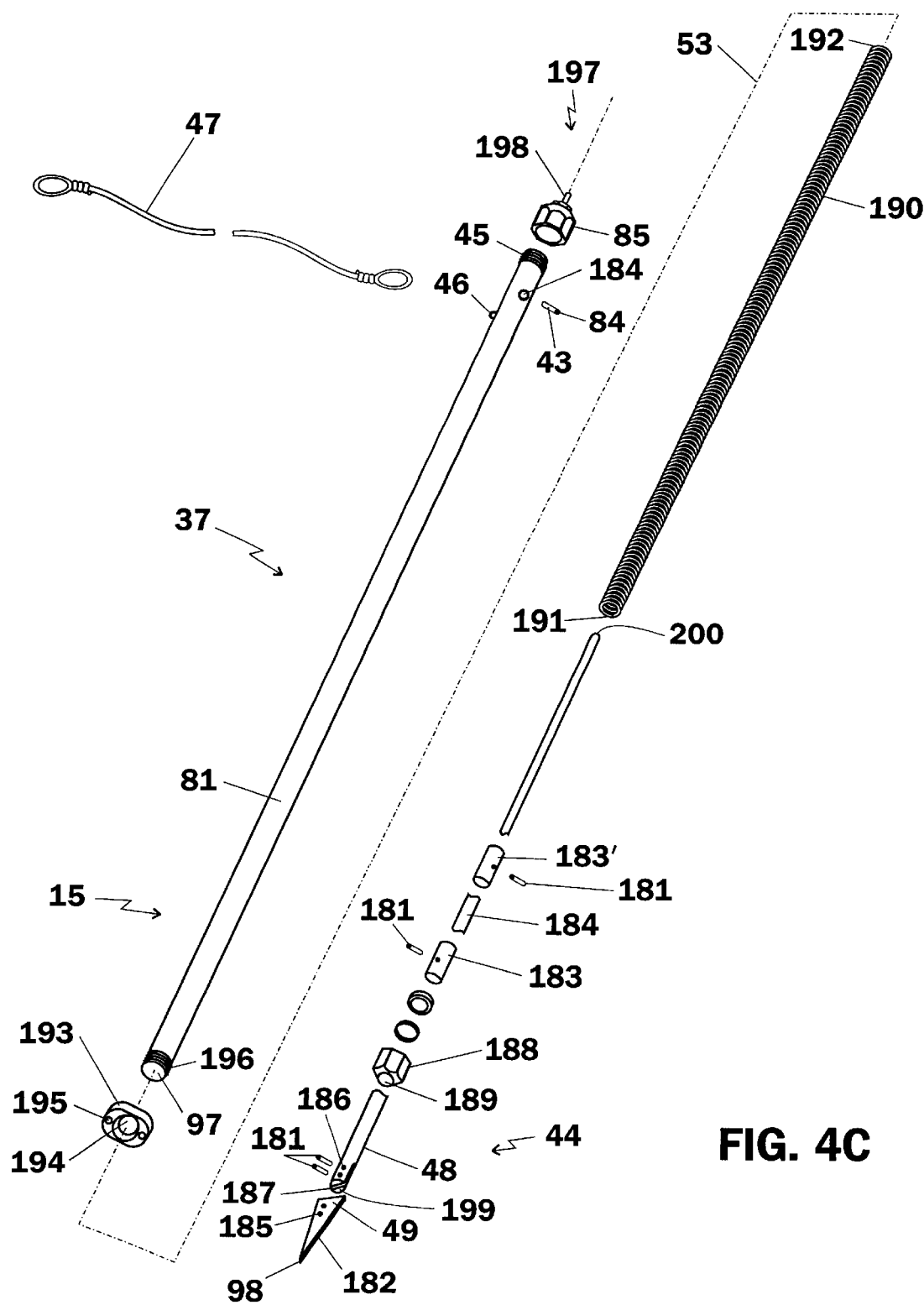
Figure 8A:
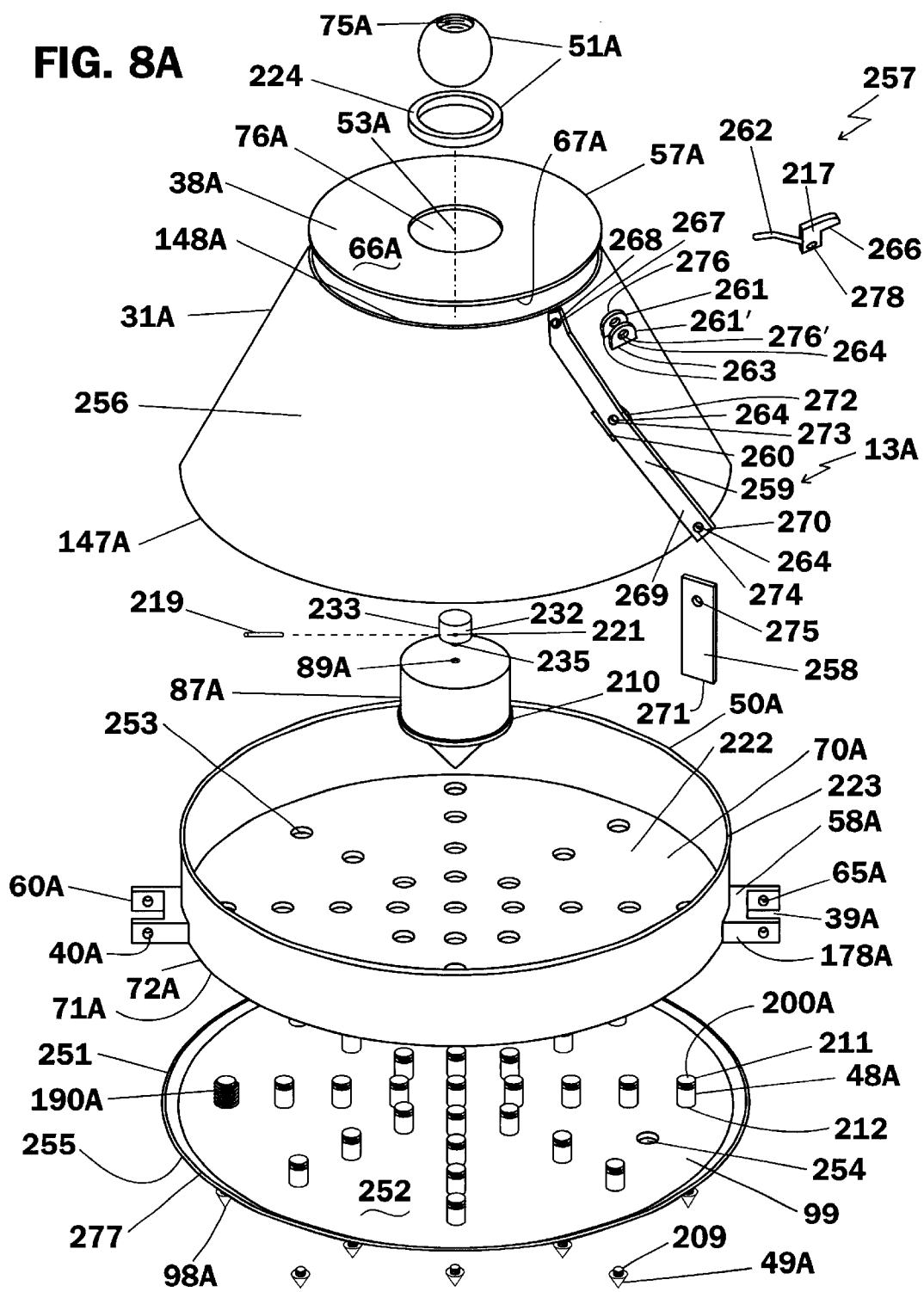
FIG. 8 is an exploded perspective view of the preferred multiple hazard marker of the multiple hazard marking system of FIG. 1 having the central portion on sheet 8a, the mast of the multiple hazard marker on sheet 8b and one of the legs on sheet 8c.
Figure 8C:
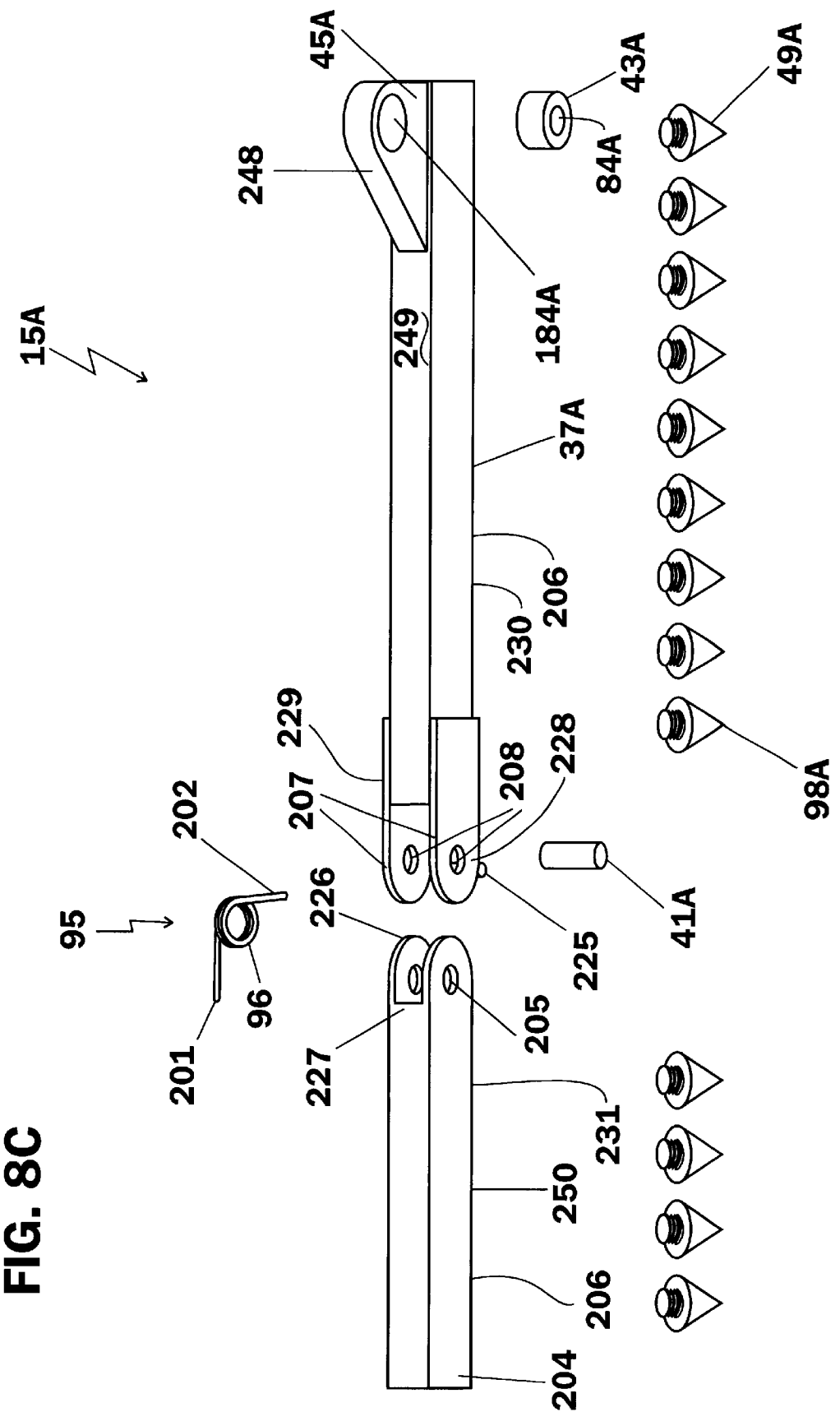

While the various features of this invention are hereinafter described and illustrated as a multiple hazard marker system consisting of a multiple hazard marker, a deployment surface and a means for deploying the multiple hazard marker, wherein the multiple hazard marker comprises a surface engaging portion, an upper portion and a central portion, a means for remaining erect when deployed associated with the surface engaging portion, a means for marking a position upon a field where deployed associated with the upper portion, a means for collapsing or expanding associated with the central portion, a means for signaling, a means for activating associated with the means for signaling and a means for transmitting associated with the means for activating and the means for deploying the multiple hazard marker comprising a means for collapsing the multiple hazard marker, a means for retaining the multiple hazard marker and a means for releasing the multiple hazard marker, it is to be understood that the various features of this invention can be used singly or in various combinations thereof in a system of marking a position upon a deployment surface and/or indicating the presence of hazardous conditions therearound as can hereinafter be appreciated from a reading of the following description. For instance, the multiple hazard marker of this invention may be as depicted in FIGS. 4a, 4b, and 4c or may be as shown in FIGS. 8a, 8b and 8c or a combination thereof. Furthermore, the showing of the embodiments in the figures is merely representative of the myriad of multiple hazard markers which can be constructed to accomplish the purposes of this invention and this invention is not to be limited in the scope by the figures presented.

Figure 1:
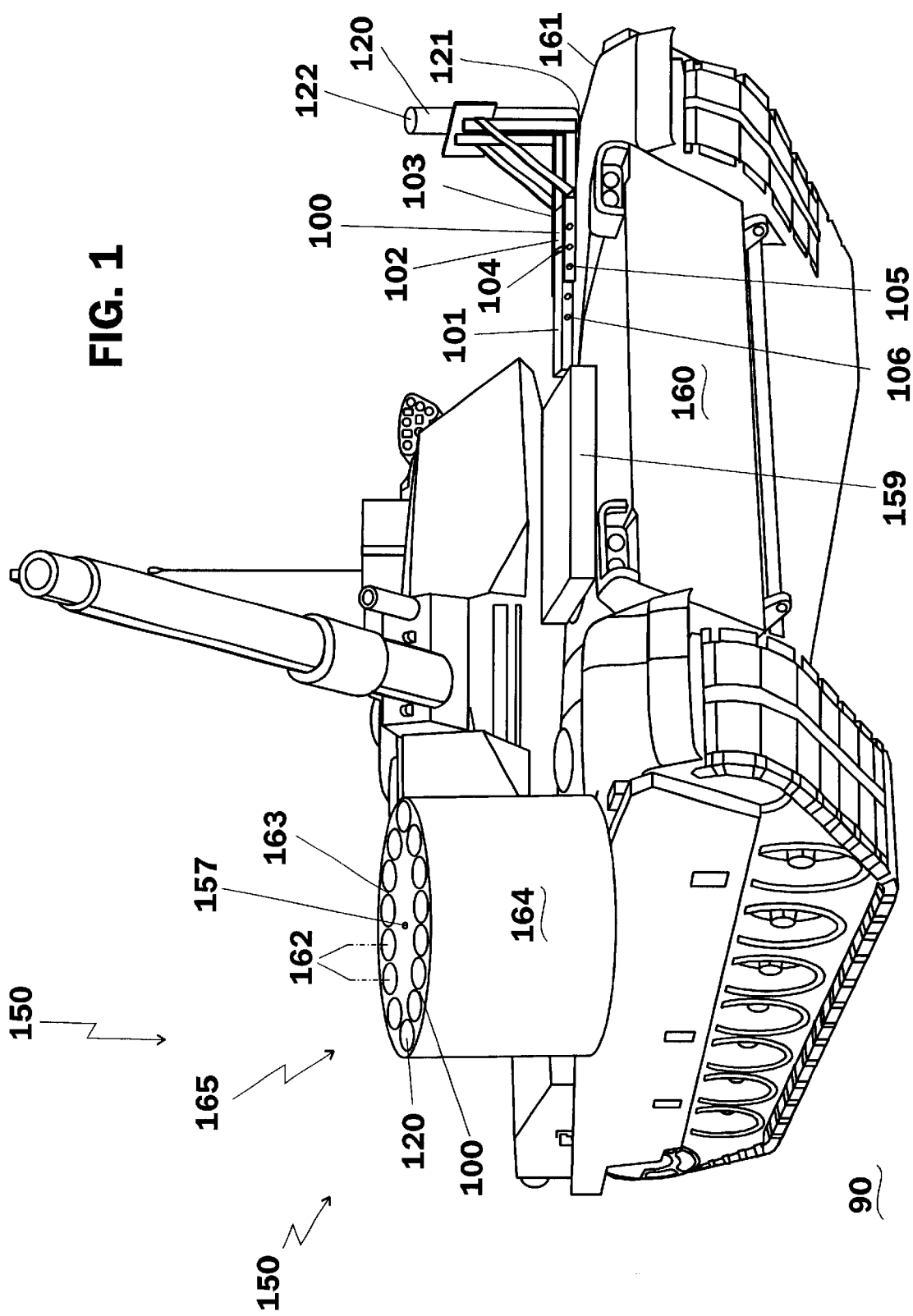
FIG. 1 is a perspective view of an embodiment of the multiple hazard marker system of this invention.

Referring now to FIG. 1, the multiple hazard marker system generally described by the numeral 150 consists of a means for deploying the multiple hazard marker mounted upon a ground engaging deployment vehicle 160, means for deploying 100 having at least one multiple hazard marker therein. As best observed in FIG. 7, means for deploying 100 comprises a mounting bracket 103 generally horizontally disposed for mounting upon deployment vehicle 160, however, means for deploying 100 may be altered to allow mounting bracket 103 to be disposed in any other orientation as required by the structure of deployment vehicle 160. Mounting bracket 103 comprises a channel 102, a mounting bar 101 and attachment pins 104, channel 102 having openings 105 and mounting bar 101 having openings 106 respectively, openings 105 and 106 adapted to receive attachment pins 104 therein. Channel 102 is adapted to slide longitudinally along mounting bar 101 for extending or retracting means for deploying 100 therealong in order to place means for deploying 100 at further or closer orientations to an edge 161 of deployment vehicle 160. Three mounting openings 105, 106 are shown in each of channel 102 and mounting bar 101 respectively, however, it is to be understood that openings 105 and/or 106 may be disposed along the entire length of channel 102 or mounting bar 101 to provide for a greater number of longitudinal orientations.

Figure 3:
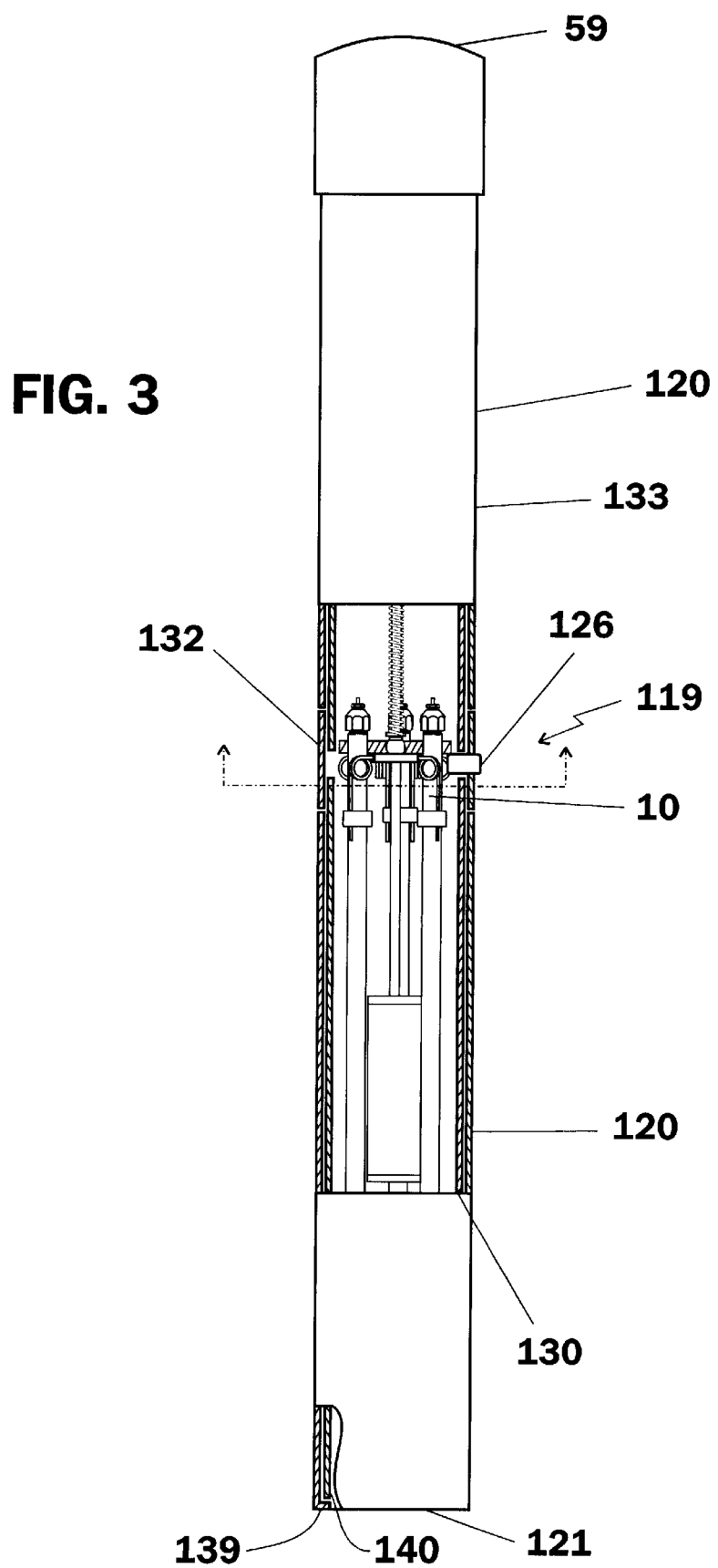
FIG. 3 is an enlarged partial cross sectional view of the cartridge utilized in the multiple hazard marker system of FIG. 1 having a multiple hazard marker in a stowed position therein
Figure 7:
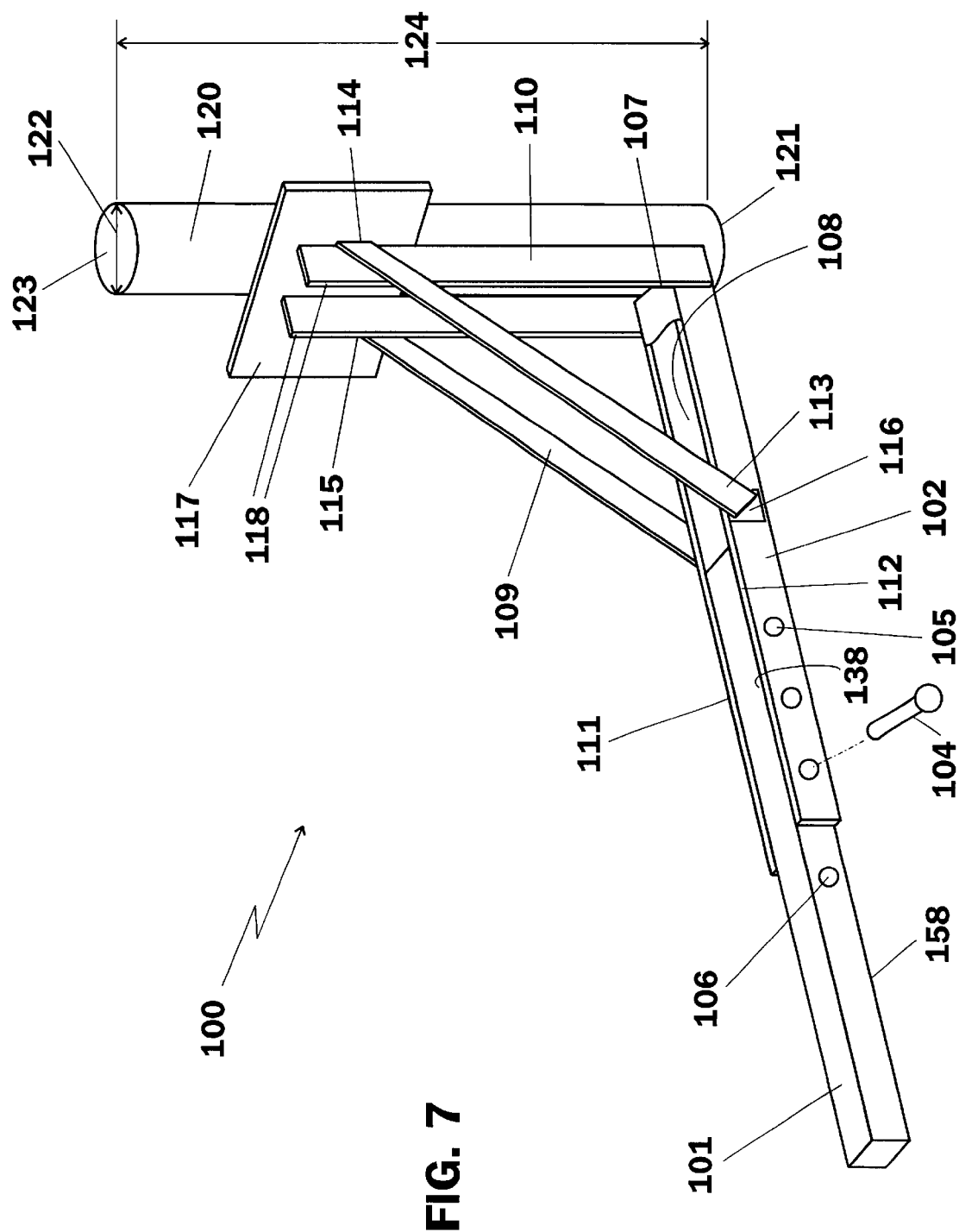
FIG. 7 is an enlarged perspective view of the means for deploying the multiple hazard marker of the multiple hazard marker system of FIG. 1.

In FIG. 7, a cartridge tube 120 is affixed to the terminal end 107 of channel 102 in an orientation to provide for vertical deployment of multiple hazard marker therefrom. Cartridge tube 120 is mounted at a right angle to channel 102 as channel 102 is adapted to slide horizontally along mounting bar 101 atop deployment vehicle 160. Channel 102 is shown oriented downwardly with the majority of the closed end removed for clarity, however open channel 108 may be upwardly oriented or toward either side as well. Cartridge tube 120 is permanently fixed to terminal end 107 and has a lower end 121 disposed slightly below the lower surface 158 of mounting bar 101 such that lower end 121 is located above a deployment surface 90 at least the length of a deployed multiple hazard marker. Referring also to FIG. 3, cartridge tube 120 is generally tubular having a diameter 123, an upper end 122 and a length 124 between lower end 121 and upper end 122. Length 124 is generally at least the length of a collapsed multiple hazard marker such as multiple hazard marker 10, 10A shown therein such that the multiple hazard marker 10, 10A assumes a vertical orientation within cartridge 120. Therefore, length 124 is at least three feet and may be more than five feet, and in the embodiment shown in FIGS. 8a, 8b and 8c cartridge may have more than one multiple hazard marker 10A held therein ready for deployment therefrom. As cartridge 120 stands upright in a vertical orientation, upright standards 110 and angled support braces 109 are affixed to channel 102, upright standards 110 extending upwardly at a right angle from each upright edge 111, 112 of channel 102 a portion of length 124 of cartridge 120. Angled support braces 109 are disposed at an angle to channel 102 and affixed to pads 116 fixed in turn to upright edges 111, 112 at one end 113 thereon and to upright standards 110 near an opposite end 115 thereof, ends 115 extending alongside cartridge 120 and further being affixed thereto. A support 117 may be affixed to upright standards 110 at the upper ends 118 thereof, ends 115 of angled support braces 109 protruding through holes 114 in support 117. Support 117 generally extends above upper ends 118 of upright standards 110 providing more support to cartridge 120.

Referring again to FIG. 1, the embodiment shown on the right side of deployment vehicle 160 in FIG. 1, a military tank, must be reloaded after deployment of the multiple hazard marker 10, 10A therein, however, an automated deployment device 165 shown on the left side of deployment vehicle 160 having a plurality of means for deploying 100 arranged in a circular fashion about a central point 157 forming a carousel 164 may be employed to deploy a plurality of multiple hazard markers 10, 10A in sequential fashion. Carousel 164 is shown on the left side of deployment vehicle 160 and may contain up to one hundred means for deploying 100, carousel 164 rotating an angular amount equal to the angular distance between the center lines 162 of each means for deploying 100 for each multiple hazard marker 10, 10A to be deployed. Carousel 164 has a control and drive mechanism 159 to control the rotation thereof and fix each sequential means for deploying 100 in a deployment position approximating the deployment position of the single means for deploying 100 shown on the right side of deployment vehicle 160. Of course, multiple circular rows 163 of means for deploying 100 may be provided for in carousel 164 by reducing the number of means for deploying 100 for each successive inwardly disposed row 163. Cartridge tube 120 has both ends 121, 122 open for ease of loading and deploying of multiple hazard markers 10, 10A and due to the height of the tank, the lower end 121 is disposed approximately seven feet above deployment surface 90.

The preferred embodiment of the marker of this invention is adapted to be deployed in a collapsed condition and ready to expand vertically and horizontally on alighting upon deployment surface 90. Thus, the marker 10A shown in FIGS. 8a, 8b, 8c and 9, when deployed from cartridge tube 120 of means for deploying 100, has a means for expanding 12A associated with a central portion 13A, a means for remaining erect 14A associated with a surface engaging portion 15A, means for expanding 12A allowing for vertical expansion of an upper portion 17A and horizontal expansion of the means to remain erect 14A as will hereinafter be fully explained. Multiple hazard marker 10A shown in FIGS. 8a, 8b & 8c may be loaded in a cartridge 120 having multiple release mechanisms 119 for holding several multiple hazard markers 10A therein, each marker 10A being in a collapsed state and being deployed by gravity from lower end 121.

Multiple hazard marker 10A of FIG. 9 has an upper portion shown in FIG. 8b generally described by the numeral 17A, a central portion in FIG. 8a generally described by the numeral 13A and a surface engaging portion in FIG. 8c generally described by the numeral 15A. Upper portion 17A comprises an elongated mast 18A having an upper end 19A and a lower end 20A and is generally a hollow tube in several sections, each section approximately one foot long, the uppermost section 18A' having an outside surface 28A, a bore 29A', outside surface 28A being threaded on terminal end 238. Elongated mast 18A is adapted to be extended to a length substantially equal to the sum of the lengths of the individual sections and in this preferred embodiment is substantially equal to five times the length of uppermost section 18A' as measured from terminal end 238 to lower end 239. Lowermost section 18A" is threaded on both ends thereof, threads 214 on lower end 20A being threadedly received in a spherical bearing or gimbal to be hereinafter described, lower end 239 further has a hole 218 disposed therethrough for accepting a roll pin 219 therein. Roll pin 219 is inserted into hole 218 and a hole 221 in stud 232 of counterweight 87A after assembly of mast 18A and insertion of a compression spring 220 through the hollow portions of each section of mast 18A. Uppermost section 18A' carries a means for marking 16A which may comprise a luminescent or phosphorescent coating 22A on a portion 21A of outside surface 28A for ready recognition in dark environs, and/or the identification flag 155 of FIG. 4b having indicia 156 thereupon, and may further comprise a lighting lens 24A of means for signaling 36 of FIG. 6 affixed to terminal end 23A, lighting lens 24A illuminated by one of electrically actuated light bulbs 32, bulbs 32 providing a constant source rather than a pulsating strobe for enhanced use in limited visibility. Means for marking 16A is readily observed by personnel on foot or in vehicles as terminal end 23A is adapted to be disposed at least five feet above deployment surface 90.

Lower end 20A of lowermost section 18A" of mast 18A has a counterweight 87A associated therewith, counterweight 87A shown in FIG. 8a providing a righting moment to elongated mast 18A thus making mast 18A always substantially vertical after multiple hazard marker 10A is fully deployed upon deployment surface 90. Referring to FIG. 8a, mast 18A is supported in a spherical bearing or gimbal 51A mounted in a mounting bore 76A disposed in a top plate 38A and press fit thereinto. Counterweight 87A may be a solid metallic mass and is typically about three inches in diameter and four inches in length. One end is tapered and at the juncture of the taper a cushion 210 is provided. On one end 233, stud 232 is substantially the same diameter as inner bore 29A of lowermost section 18A" of mast 18A with threads 235 on an opposite end thereof for being threaded into threaded bore 89A opposite the tapered end of counterweight 87A. Counterweight 87A is preferably made of steel but may be brass, lead, cast iron or a thermoplastic material containing comminuted particles of a metallic material.

As best observed in FIG. 8a, central portion 13A comprises top plate 38A, substantially conical housing 31A, gimbal 51A, a base mounting plate 50A having ears 58A affixed to the outer curved surface 72A thereof and associated securement parts hereinafter described. In this preferred embodiment, top plate 38A is flat sheet metal disc having an outer diameter 57A welded to an upper end 148A of conical housing 31A. Conical housing 31A is preferably formed of sheet metal, rolled into a conical shape with the terminal ends of the sheet butt welded to form a rigid upright cone as shown. Base mounting plate 50A is a shallow pan-like element also formed of sheet metal and is welded to a lower end 147A of conical housing 31A after assembly of all parts of surface engaging portion 15A hereinafter described thereonto. Leg slots 39A are disposed within protruding ears 58A, ears 58A generally disposed ninety degrees apart on outer curved surface 72A though a greater or lesser number of ears 58A may be affixed thereto for accepting a greater or lesser number of legs 37A. Only two ears 58A are shown in FIG. 8a for clarity. Leg pins 41A are adapted to be disposed through leg pin holes 40A which are formed perpendicular to leg slots 39A through lobes 60A of ears 58A and thus legs 37A are journaled therein. Leg pin holes 40A pass completely through lobes 60A such that leg pins 41A may be inserted from either lobe 60A through leg 37A and pivot sleeve 43A into the opposite lobe 60A thereby pivotally attaching legs 37A to base mounting plate 50A. Leg pin holes 40A may be counter bored in one of lobes 60A for accepting a socket head cap screw 61 of FIG. 4a therein as leg pin 41A, socket head cap screw 61 having a threaded portion 63 and a head portion 64, head portion 64 adapted to be seated in the counter bore when threaded portion 63 is disposed through leg holes 40A, pivot sleeve 43A and leg 37A into a threaded portion 65A of leg pin hole 40A. In the preferred embodiment, threaded portion 65A is omitted and leg hole 40A is a smooth bore through both lobes 60A. When used, socket head cap screws 61 have mating nuts 180 threaded onto threaded portion 63 thereof, nuts 180 disposed against an outer edge 178A of one lobe 60A while head portion 64 bears against outer edge 178A of the other lobe 60A. Carriage bolts or machine bolts having a head portion 64 and a threaded portion 65 may also be used in place of socket head cap screws 61. Similarly, a fixed diameter pin may be inserted therein and peened on either or both ends fixing same in pivot hole 40A in lobes 60A.

Top plate 38A has upper surface 66A and lower surface 67A, with a mounting hole 76A bored through from upper surface 66A to lower surface 67A on centerline 53A for receiving gimbal 51A therein. Mounting hole 76A is substantially larger in diameter than the outside diameter 78A of lowermost section 18A" of mast 18 but is substantially the same diameter as mounting sleeve 224 of gimbal 51A for press fitting gimbal 51A thereinto. Since mounting hole 76A is substantially larger in diameter than lowermost section 18A" of mast 18A, mast 18A is readily tiltable and rotatable therewithin after assembly of multiple hazard marker 10A.

Gimbal 51A has a threaded hole 75A substantially the same diameter as outer diameter 78A of lowermost section 18A" of mast 18A through its geographic center for threadedly receiving mast 18A therein. Typically, gimbal 51A is a spherical bearing mounted in a mounting sleeve 224, mounting sleeve 224 adapted to frictionally engage bore 76A in top plate 38A. As gimbal 51A is free to rotate within mounting sleeve 224, mast 18A always assumes a vertical orientation without regard to the contour of deployment surface 90.

Referring again to FIGS. 8a, 8b and 8c, multiple hazard marker 10A is assembled by first press fitting gimbal mount 224 into top plate 38A, threading lower end 20A of mast 18A into and through threaded bore 75A in gimbal 51A such that hole 218 through lowermost mast portion 18A" is accessible below gimbal 51A. Compression spring 220 is inserted into bore 29A of mast 18A fully extending mast 18A. Stud 232 is then inserted into lower end 20A mast 18A and roll pin 219 is driven through holes 218 and 221 affixing stud 232 to mast 18A below gimbal 51A. Top plate 38A is welded to upper end 148A of housing 31A before assembly of counterweight upon lower end 20A of mast 18A.

Referring now to FIG. 8b, mast 18A comprises several short sections beginning with the largest diameter piece, lowermost section 18A" and terminating in the smallest diameter piece, uppermost section 18A', all these sections joined together in a manner well known in the art such that mast 18A may be telescopically extended to its full height without the individual sections becoming separated. Uppermost section 18A' has threads 237 upon its terminal end 238 for receiving an instrument housing 234 thereon. Bore 29A' in uppermost section 18A' is slightly smaller than the outside diameter of compression spring 220 such that compression spring 220 bears against the lower end 239 thereof allowing for full extension of mast 18A. Mast latch mount 216 is slipped over terminal end 238 of uppermost mast section 18A' aligning threaded hole 247 with threads 213 and threaded upon threads 213 on lowermost mast section 18A". Mast latches 240 are pinned to mast latch mount 216 with latch pins 241 passing through latch pin holes 242 in mast latch mount 216 and hole 243 in latch 240. Mast latch 240 may be biased outwardly from mast 18A with a biasing element 95 similar to spring 96 shown in FIG. 8c wrapped around latch pin 241 with ends 201 and 202 associated with latch mount 216 and latch 240 respectively. Threaded hole 247 in mast latch plate 215 is aligned with threads 237 upon terminal end 238 of uppermost mast section 18A' and then threaded thereon leaving a portion of threads 237 visible above mast latch plate 215 for mounting instrument housing 234 thereon. Mast latch plate 215 and mast latch mount 216 are formed from flat plates of metal and are substantially equal in size. Slots 244 are machined into each end of each plate with latch pin holes 242 cross bored through the ends thereof adapted to have latch pins 241 inserted therein. Latch pins 241 are typically one inch long, one quarter inch diameter roll pins and are inserted into latch pin holes 242 in mast latch plate 215 for receiving latch 240 thereon. Slots 244 in mast latch plate 215 are aligned with slots 244 in mast latch mount 216 and set screws 245 are threaded into cross bored holes 246 in mast latch plate 215 and mast latch mount 216 to maintain alignment of slots 244. Mast 18A may then be compressed to its shortest height, substantially equal to the length of lowermost mast section 18A" with latches 240 being registered with latch pins 241 in mast latch plate 215 to retain mast 18A in a compressed condition. Latches 240 are formed from flat bar stock and are identical to leg latch 217 without a protruding latch finger 262.

Upper end 19A of mast 18A is then fitted with an instrument housing 234 by threading instrument housing 234 upon threaded end 237 of uppermost section 18A'. Instrument housing 234 is formed as a hollow sphere in two mating halves adapted to be threaded together. One half has a threaded hole 236 to be received onto threads 237 of uppermost section 18A' of mast 18A. Instrument housing 234 has circuit board 91 of FIG. 6 mounted therein, circuit board 91 having electronic integrated circuitry, sensing elements, light bulbs, receivers and transmitters. Circuit board 91 may receive power for transmission by absorbing power from the initial detected received transmission through inductive coupling. If it is desired to provide communication between instrument housing 234 and housing 31A, connecting wires may be threaded through bore 29A of mast 18A from instrument housing 234 to housing 31A, these wires assuming a coil like structure when mast 18A is compressed and exiting mast 18A above the end of stud 232 through a hole provided in lower end 20A of lowermost mast section 18A". Instrument housing 234 contains means for marking 16A a location on deployment surface 90, means for marking 16A comprising a means for visibly signaling the presence of physical hazards by signal flags 155 affixed to marker 10A and/or at least one luminous device 24A associated therewith, means for determining the presence of ABC hazards and a means for communicating, the means for communicating including a means for receiving radio frequency signals from remote transmitters and/or a means for electronically transmitting toxicity levels of said ABC hazards to remote transceivers. The means for signaling the presence of said ABC hazards may also comprise a means for changing the color of the luminous device 24A associated with said marker 10A. The short-range wireless transceivers are capable of sending an identifying code and several multiplexed data streams. The transceivers operate at lowpower (less than 2 W), over short-to-intermediate range (~1 km minimum goal), are capable of being carried in the pocket of a battle dress uniform and are commercially available off the-shelf components. In the preferred embodiment of the marker system 150 of this invention, at least one of the remote transceivers is associated with deployment vehicle 160. When flag 155 is used on marker 10A, uppermost mast section 18A' functions as a flag carrying tube, flag 155 affixed around the outer periphery 28A thereof and secured upon itself with the hook and loop fastener associated with flag 155.

Base mounting plate 50A is a shallow like pan structure and comprises a flat base disc 222 and an upright peripheral wall 223 welded thereto. Flat base disc 222 has inside surface 70A and bottom surface 71A. Ears 58A are welded to outer curved surface 72A of upright wall 223, ears 58A protruding outwardly therefrom. A series of foot holes 253 arranged in radial rows are disposed through flat base disc 222 for receiving feet 48A therein.

Referring now to FIG. 8c, preferably, legs 37A are cut to length from a section of ¾" square tubing having a wall thickness of 1/16" and have pivot tongues 207 welded to opposite sides thereof, pivot tongues 207 formed from 1/18" thick flat metal strips and extending beyond the end of the section of square tubing. Pivot tongues 207 have pivot holes 208 disposed therethrough for receiving leg pins 41A therein at assembly of legs 37A. On the surface 249 of pivot end 45A opposite pivot tongues 207, a steel pivot lug 248 is welded, pivot lug 248 having a leg pivot hole 184A disposed therethrough for receiving a brass pivot bushing 43A. Legs 37A are mounted in slots 39A shown in FIG. 8a, and are pinned thereto utilizing leg pins 41A. Each leg 37A has a pivot sleeve 43A disposed through a leg hole 184A bored through pivot lug 248 of leg 37A adjacent a pivot end 45A thereof, sleeve 43A press fitted therein and extending completely through pivot lug 248, sleeve 43A having a length substantially the same as the distance between lobes 60A. Pivot sleeve 43A provides for easy assembly of legs 37A into slots 39A. Legs 37A are generally square but may be circular, triangular or any other cross sectional shape. The diameter of pivot holes 84A through sleeves 43A is substantially the same as the diameter of leg pins 41A allowing for free movement thereon. Leg 37A is biased outwardly away from base mounting plate 50A by a spring 96 wound around sleeves 43A with end 201 disposed within leg 37A and end 202 disposed against outer curved surface 72A. Opposite pivot end 45A of leg 37A is an articulated leg extension 204, leg extension 204 biased in an outward direction by another spring 96 wound around sleeves 43A with end 202 disposed within leg 37A and end 201 disposed within leg extension 204 and adapted to be disposed along the same axis as leg 37A. Leg extensions 204 are also cut to length from a section of ¾" square tubing having a wall thickness of 1/16" and have one end 227 rounded terminating in curved surfaces 226, end 227 cross drilled with a pivot hole 205. Springs 96 allow leg 37A and leg extension 204 to flex upwardly on an uneven deployment surface 90. Leg extension 204 is prevented from moving beyond a straight line extension of leg 37A by a stop pin 225 welded across pivot tongues 207 of leg 37A, stop pin 225 bearing against the lower surface 250 of leg extension 204 at the juncture of curved surface 226 and lower surface 250. At assembly, leg pin 41A affixes leg extension 204 to leg 37A by first passing through one pivot hole 208 in leg 37A then through one pivot hole 205 of leg extension 204 then through spring 96 and finally through the other pivot holes 205, 208. Socket head cap screws 61 may be used as leg pins 41A, socket head cap screws 61 having nuts 180 affixed to the threaded portion 63, head portion 64 of cap screw 61 bearing against surface 228 and nut 180 bearing against surface 229 of leg 37A. Each of leg 37A and leg extension 204 have a plurality of toes 49A associated therewith. Toes 49A are affixed to outer surfaces 230 of leg 37A and 231 of leg extension 204 for positive engagement with deployment surface 90. Toes 49A are pointed such that toes 49A penetrate deployment surface 90 thereby establishing firm engagement for multiple hazard marker 10A. Toes 49A are conical arrow point elements having a point 98A at one end and a threaded portion 209 at the opposite end thereof. Toes 49A are generally threaded into toe holes 206 provided in outer surfaces 230 and 231 of leg 37A and leg extension 204 respectively.

Referring again to FIG. 8a, a skid plate 99 is formed from a flat piece of sheet metal having an up-turned peripheral edge 251 forming a shallow lipped open pan. Edge 251 extends beyond the outer curved surface 72A of base mounting plate 50A and is angled upwardly from the plane of the flat sheet by 45 degrees. Skid plate 99 is biased away from base mounting plate 50A for absorbing shock for multiple hazard marker 10A when deployed upon deployment surface 90. A series of feet 48A are welded to skid plate 99 on an inside surface 252 thereof at the same spacing and radial arrangement as the arrangement foot holes 253 in base mounting plate 50A. Feet 48A have upper end 200A threaded whilst end 212 is machined square for welding to skid plate 99. Springs 190A are provided over feet 48A after feet 48A are welded to skid plate 99. Feet 48A are then aligned with foot holes 253 in base mounting plate 50A having threaded portion 211 extending therethrough. Nuts 180 are affixed to threaded portions 211 of feet 48A thereby affixing skid plate 99 to base mounting plate 50A. Feet 48A are adapted to move freely through foot holes 253 thus providing for the aforementioned shock absorbing capabilities. Skid plate 99 also has toe holes 254 disposed into the exterior surface 255 thereof, toe holes 254 adapted to threadedly receive toes 49A therein for aggressively gripping deployment surface 90 when alighting thereupon. Toe holes 254 are spaced from the locations of each of feet 48A but may be aligned therewith with toes 49A threading into feet 48A by providing a threaded hole in each of feet 48A. Thus, surface engaging portion 15A is readied for assembly to central portion 13A of marker 10A.

After assembly and until alighting upon deployment surface 90, legs 37A along with leg extensions 204 are latched in a folded position upon an outer angled surface 256 of housing 31A. An actuating mechanism generally shown in FIG. 8a with numeral 257 is affixed to angled surface 256 having an actuating finger 258 adapted to rest upon upturned edge 251 of skid plate 99 such that when skid plate 99 moves upon contact with deployment surface 99, actuating finger 258 causes leg catches 217 to release legs 37A and leg extensions 204. Actuating mechanism 257 comprises leg catches 217, actuating finger 258, lever arm 259, lever mount 260, latch mounts 261, 261' and latch finger 262; lever mounts 260 and latch mounts 261, 261' welded to angled surface 256 of housing 31A. Latch mounts 261, 261' have an angled base 263 cut at the same angle as angled surface 256 and are transversely mounted on angled surface 256. One latch mount 261' is longer than latch mount 261 due to the angled surface 256. Latch mounts 261, 261' have pin holes 276, 276' therethrough for receiving a pivot pin 264 therein affixing leg catch 217 thereto. Lever mount 260 is also welded to angled surface 256 but is disposed longitudinally along angled surface 256 and thus has a square cut base. Leg catch 217 is formed from a flat piece of bar stock and has a square surface 266 disposed longitudinally and laterally from a pivot pin hole 278, square surface 266 adapted to engage leg extension 204 to retain leg 37A in the folded position. Leg catch 217 also has latch finger 262 extending away from leg latch 217 adapted to fit within a trip hole 267 in lever arm 259. Lever arm 259 is a flat piece of bar stock having one section 268 angled upwardly to space trip hole 267 at the proper distance to receive latch finger 262 therein. The straight section 269 of lever arm 259 lies substantially parallel to angled surface 256 of housing 31A. Lever arm 259 has a central pivot pin hole 273 approximately centrally located in the length thereof and one additional pin hole 274 located near an end 270 of section 269. Actuating finger 258 is a 1/18" thick flat piece of bar stock having a pivot pin hole 275 near an end opposite skid plate engaging surface 271, pivot pin hole 275 adapted to be fitted with a pivot pin 264 in engagement with pivot pin hole 274 in end 270 of lever arm 259, skid plate engaging surface 271 adapted to rest upon up-turned edge 251 of skid plate 251. Skid plate engaging surface 271 of actuating finger 258 may be welded to upturned edge 251 after assembly of marker 10A. After lever mount 260 and latch mounts 261, 261' have been welded to angled surface 256, lever arm 259 is pinned to lever mount 260 through pivot pin hole 272 in lever mount 260 and the central pivot hole 273 with a pivot pin 264 which may be a bolt or peened rivet. Leg latch mounts 261, 261' are then welded to angled surface 256 spaced from lever mount 260 and leg latch 217 pinned thereto with a pivot pin 264. Actuating finger 258 is pinned to lever 259 at lever pin hole 274 with a pivot pin 264. Latch finger 262 is then inserted into trip hole 267 awaiting folding of legs 37A at final assembly. In FIG. 9, the assembled latching mechanism 257 is shown holding leg 37A against housing 31A.

Prior to assembly of surface engaging portion 15A with central portion 13A, and if desired, additional circuit boards 91 including electronic integrated circuitry, sensing elements, light bulbs, solar generators, radio receivers and transmitters may be mounted in housing 31A and connected to wires leading from instrument housing 234. When all onboard equipment is mounted and multiple hazard marker 10A is ready for final assembly, surface engaging portion 15A comprising skid plate 99, base mounting plate 50A having legs 37A pivotally mounted in ears 58A, is brought into position below conical housing 37A such that lower end 147A thereof is brought into contact with the top edge 277 of base mounting plate 50A. Lower end 147A may have an internal or external thread for mating with a corresponding thread on top edge 277 but preferably, lower end 147A is welded to top edge 277. Upon assembly of these mating edges, legs 37A are folded upon angled surface 256 of housing 31A and latched thereto with square surface 266 of actuating mechanism 257 overlying a portion of either leg 37A or leg extension 204 to retain leg 37A thereagainst until multiple hazard marker 10A engages deployment surface 90. Upon complete assembly of multiple hazard marker 10A with legs 37A folded upon angled surface 256 and mast 18A collapsed, the overall height of marker 10A is approximately two feet and at least two multiple hazard markers 10A may be readied for deployment in each cartridge tube 120, each multiple hazard marker 10A resting upon a separate release mechanism 119.

Multiple hazard marker 10A, when deployed from cartridge 120 falls toward deployment surface 90 in the fully collapsed state having leg catches 217 retaining legs 37A against angled surface 256 of housing 31A and mast latches 240 retaining mast in a fully collapsed condition. As skid plate 99 contacts deployment surface 90, skid plate 99 moves toward base mounting plate 50A, absorbing the initial shock of the drop from deployment cartridge 120, actuating fingers 258 move end 270 of lever arm 259 away from housing 31A causing trip hole 267 to move toward angled surface 256 moving latch finger 262 along therewith thereby detaching square surface 266 from leg 37A or leg extension 204. Legs 37A and leg extensions 204 spring away from angled surface 256 under force of springs 96 until toes 49 on legs 37A and leg extensions 204 contact deployment surface 90. Toes 49 are pointed to firmly engage deployment surface 90 and along with toes 49 on skid plate 99 assist in retaining multiple hazard marker 10A in a fixed position thereon. Upon alighting on deployment surface 90, the weight of instrument housing 234 and mast latch plate 215 cause a slight rebound in mast 18A causing latches 240 to fall away from mast latch plate 215 releasing mast 18A. Spring 190A within mast 18A causes mast 18A to fully telescopically expand to its full height. Thus, multiple hazard marker 10A extends to its full deployment height of approximately two meters. Once deployed upon deployment surface 90, multiple hazard marker 10A may be initialized by a remote transceiver or may be begin its own initialization and sampling sequence having been preset to begin upon deployment.

An alternate embodiment of the multiple hazard marker of this invention is adapted to be deployed primarily in an already erect orientation. Thus, in the multiple hazard marker 10 shown in FIGS. 4a, 4b and 4c, cartridge tube 120 has an end cap 59 affixed to upper end 122 after multiple hazard marker 10 is inserted thereinto, end cap 59 depressing flag carrying tube 169, when used, onto mast 18 against a spring 168. The primary purpose of spring 168 is to extend flag carrying tube 169 after deployment of multiple hazard marker 10, however, it is readily apparent from the reading of the following description that multiple hazard marker 10 is predisposed to be deployed sharply downwardly upon release of a release mechanism 119 as spring 168 assists gravity by pushing multiple hazard marker 10 from cartridge tube 120. Thus, as will be apparent from FIGS. 3 and 4, as multiple hazard marker 10 is deployed from cartridge tube 120 of means for deploying 100, a means for expanding 12 associated with a central portion 13 of multiple hazard marker 10 forms a means for remaining erect 14 associated with a surface engaging portion 15 of multiple hazard marker 10 as will hereinafter be fully explained. In a similar manner, the multiple hazard marker 10A shown in FIGS. 8a, 8b & 8c may be loaded in a cartridge 120 having multiple release mechanisms 119 for holding multiple hazard markers 10A therein, each multiple hazard marker 10A being in a collapsed state & being deployed by gravity from lower end 121.

Figure 2:
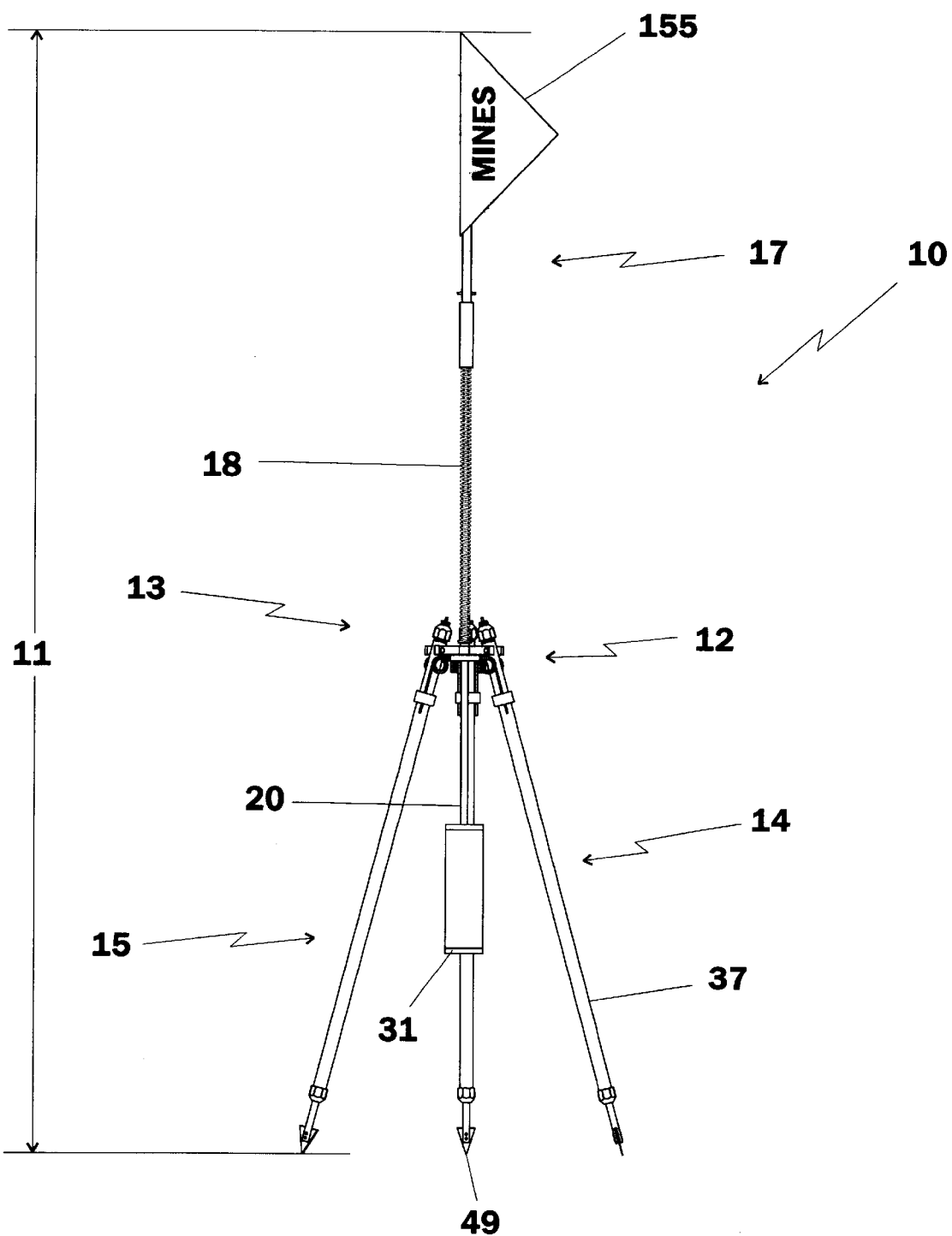
FIG. 2 is a perspective view of the preferred embodiment of the multiple hazard marker deployed upon a field to be marked.
Figure 6:
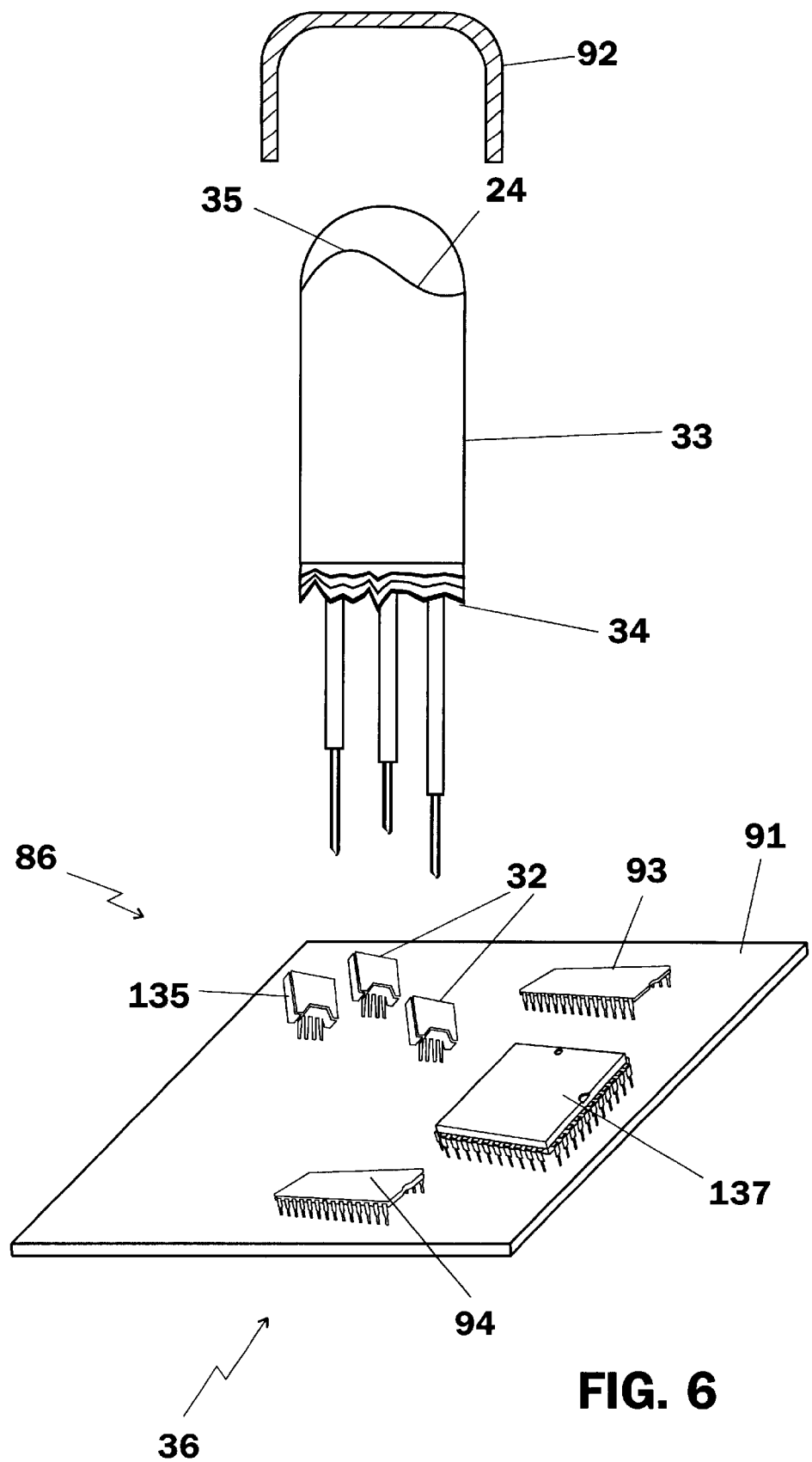
FIG. 6 is an enlarged view of a signal device utilized in the multiple hazard marker of the multiple hazard marker system of this invention.

As best seen in FIGS. 2 and 4, multiple hazard marker 10 has an upper portion in FIG. 4b generally described by the numeral 17, a central portion in FIG. 4a generally described by the numeral 13 and a surface engaging lower portion in FIG. 4c generally described by the numeral 15. Upper portion 17 comprises an elongated mast 18 having an upper end 19 and a lower end 20 and is generally a hollow tube having an outside surface 28, a bore 29 and a length 30 as measured from terminal end 23 to lower end 20. Where used as a simple marker, such as in a minefield, mast 18 may be a solid rod, however, in the preferred embodiment, mast 18 is tubular and further has a hole 166 disposed therethrough for accepting a roll pin 167 therein. Roll pin 167 is inserted into hole 166 after assembly of a compression spring 168 and flag carrying tube 169 thereupon. Flag carrying tube 169 has a slot 170 disposed through its wall 171, slot 170 extending approximately one half the length thereof having a first end 173 spaced above lower end 172 such that slot 170 does not breach end 172. Spring 168 is disposed within flag carrying tube 169, upper end 174 of spring 168 adapted to bear against the inside of a closed terminal end 23' while lower end 175 of spring 168 bears against terminal end 23 of mast 18. Whether used as a simple marker described above or used for one of the multiple uses hereinafter described, upper end 19 carries a means for marking 16 which may comprise a luminescent or phosphorescent coating 22 on a portion 21 of outside surface 28 for ready recognition in dark environs, and/or an identification flag 155 having indicia 156 thereupon, and may further comprise a lighting lens 24, as shown in FIG. 6, of means for signaling 36 affixed to terminal end 23 or 23', lighting lens 24 illuminated by one of electrically actuated light bulbs 32. Flag 155 or indicia 156 may also be made luminescent or phosphorescent. Upper end 19 may also have receiving antenna 25 and transmitting antenna 26 associated therewith, receiving antenna 25 electrically isolated from transmitting antenna 26 by insulating sleeve 27, receiving antenna 25 and transmitting antenna 26 having functions hereinafter described. Means for marking 16 is readily observed by personnel on foot or in vehicles as terminal end 23, 23' is adapted to be disposed at least five feet above deployment surface 90.

Flag 155 has a hook and loop fastener affixed to one surface 179 thereof for wrapping about mast 18 or about flag carrying tube 169 and securing the hook side to the loop side of the hook and loop fastener. When employed, flag carrying tube 169 has luminescent or phosphorescent coating 22' on a portion 21' of outside surface 28' and may also have receiving antenna 25' and transmitting antenna 26' associated therewith, receiving antenna 25' electrically isolated from transmitting antenna 26' by insulating sleeve 27'.

Lower end 20 of mast 18 has a counterweight 87 affixed thereto and may have an instrument container associated therewith. Counterweight 87 provides a righting moment to elongated mast 18, and as best observed in FIG. 2, mast 18 is always substantially vertical after multiple hazard marker 10 is fully deployed upon deployment surface 90. Referring to FIG. 4a, mast 18 is supported in a spherical bearing or gimbal 51 mounted in a mounting bore 76 disposed in a support plate 38 and a mounting bore 77 in base mounting plate 50 and attached thereto with flat head cap screws 177. Mast 18 may also be pivotally mounted between support plate 38 and base mounting plate 50 on the centerline 53 of multiple hazard marker 10 by counter boring support plate 38 from lower surface 67 and base mounting plate 50 from upper surface 70 to provide for capture of gimbal 51 therebetween when support plate 38 and base mounting plate 50 are joined together, central portion 13 joining upper portion 17 to surface engaging portion 15.

As best observed in FIG. 4a, central portion 13 comprises support plate 38, release base mounting plate 50, gimbal 51, pivot sleeves 43, leg pins 41 and associated securement parts hereinafter described. In this embodiment, support plate 38 is a six sided figure which has an outer diameter 57 partially cut away to an inner diametral surface 56 and triangular sides 83 with leg slots 39 disposed within protruding ears 58, ears 58 centrally disposed on triangular sides 83. Ears 58 extend from triangular sides 83 to outer diameter 57, while leg slots 39 extend from outer diameter 57 inwardly beyond inner diametral surface 56 substantially to triangular sides 83 such that legs 37 may freely pivot about leg pins 41. Triangular sides 83 meet at inner diametral surface 56 in truncated apices 68. Support plate 38 may alternately be described as a release plate having ears 58 protruding from sides 83 thereof. Leg pins 41 are adapted to be disposed through leg pin holes 40 which are formed perpendicular to leg slots 39 through lobes 60 of ears 58. Leg pin holes 40 pass completely through lobes 60 such that leg pins 41 may be inserted from either lobe 60 through leg 37 and pivot sleeve 43 into the opposite lobe 60 thereby pivotally attaching legs 37 to support plate 38. Leg pin holes 40 may be counter bored in one of lobes 60 for accepting a socket head cap screw 61 therein as leg pin 41, socket head cap screw 61 having a threaded portion 63 and a head portion 64, head portion 64 adapted to be seated in counter bore 62 when threaded portion 63 is disposed through leg holes 40, pivot sleeve 43 and leg 37 into a threaded portion 65 of leg pin hole 40. Usually, threaded portion 65 is omitted and leg hole 40 is a smooth bore through both lobes 60. Socket head cap screws 61 having mating nuts 180 threaded onto threaded portion 63 thereof have nuts 180 disposed against an outer edge 178 of one lobe 60 while head portion 64 bears against outer edge 178 of the other lobe 60. Carriage bolts or machine bolts having a head portion 64 and a threaded portion 65 may also be used in place of socket head cap screws 61.

Support plate 38 is disposed superior to base mounting plate 50 and secured thereto with bolts 52 screwed into threaded holes 54 in base mounting plate 50, bolts 52 disposed through holes 55 in support plate 38. In FIG. 4a, base mounting plate 50 is shown separated out of plane from support plate 38 for clarity. Support plate 38 has upper surface 66 and lower surface 67, and has a mounting hole 76 bored through from upper surface 66 to lower surface 67 on centerline 53 for partially receiving gimbal 51 therein. Mounting hole 76 is substantially larger in diameter than the outside diameter 78 of mast 18 but is substantially the same diameter as gimbal 51 for press fitting gimbal 51 thereinto. Since mounting hole 76 is substantially larger in diameter than mast 18, mast 18 is readily rotatable therewithin after assembly of multiple hazard marker 10.

Base mounting plate 50 has its apices 73 rotated 60 degrees from leg slots 39 formed into support plate 38 but aligned with apices 68 thereof, leg slots 39 extending inwardly from an outer diameter 57 and thereby centrally located along each of sides 69 of base mounting plate 50. Apices 73 are curved surfaces 72 corresponding in diameter to inner diametral surface 56 of support plate 38, curved surfaces 72 extending between ears 58 upon assembly of base mounting plate 50 to support plate 38. Base mounting plate 50 has upper surface 70 and bottom surface 71, plate 50 also having a mounting bore 77 formed thereinto on centerline 53 for partially receiving gimbal 51 therein. Mounting bore 77 is identical in diameter to mounting bore 76 and is also adapted to receive gimbal 51 therein in tight fitting relationship. Thus, mounting bore 77 is also substantially larger than mast 18 thereby allowing full movement of mast 18 about gimbal 51. Upper surface 70 is adapted to mate with lower surface 67 of support plate 38 and be contiguous therewith forming a continuous bore 76, 77 therein for receiving gimbal 51 therein. Gimbal 51 may also be held in bore 76, 77 by flat head cap screws 177 received in threaded bores 176 in opposite sides of the mount for gimbal 51. Threaded bore 176 extends completely through the mount having the heads of cap screws 177 threaded from both sides of the mount, the heads of cap screws 177 extending beyond the outer diameter of the mount for gimbal 51 over a portion of surface 66 of plate 38 and surface 71 of plate 50 to capture gimbal 51 thereunder. Threaded bores 176 may also be disposed into plates 38 and 50 having the heads of cap screws 177 overlapping the mount for gimbal 51 to capture same thereunder.

Gimbal 51 has a hole 75 substantially the same diameter as outer diameter 78 of mast 18 through its geographic center for receiving mast 18 therethrough and has mast 18 firmly affixed therein. Typically, gimbal 51 is a spherical bearing and may be expanded by heating, or mast 18 may be supercooled, prior to sliding mast 18 therein. Thus, hole 75 is expanded along with gimbal 51, or mast 18 reduced in diameter, and after inserting mast 18 to its desired location within gimbal 51, gimbal 51 and mast 18 are allowed to return to ambient temperature thereby rigidly affixing gimbal 51 to mast 18. As gimbal 51 is free to rotate, mast 18 always assumes a vertical orientation without regard to the contour of deployment surface 90.

Referring to FIGS. 4a, 4b and 4c, legs 37 are mounted in slots 39 and are pinned thereto utilizing leg pins 41. Each leg 37 has a pivot sleeve 43 disposed through a leg hole 184 bored through leg 37 adjacent a pivot end 45 thereof, sleeve 43 press fitted therein and extending completely through leg 37 beyond outer surface 81, sleeve 43 having a length substantially the same as the distance between lobes 60. Pivot sleeve 43 strengthens leg 37 at its mounting location and provides for easy assembly of legs 37 into slots 39. Legs 37 are generally circular but may be square, triangular or any other cross sectional shape. The diameter of pivot holes 84 through sleeves 43 is substantially the same as the diameter of leg pins 41 allowing for free movement thereon. Opposite pivot end 45 of leg 37 is a deployment surface engaging end 44 having a foot 48 associated therewith. Foot 48 may further have at least one spike like element such as toe 49 thereon for positive engagement with deployment surface 90. Toe 49 may be pointed such that toe 49 penetrates deployment surface 90 thereby establishing a firm release base for multiple hazard marker 10. Leg 37 may further be fitted with an end cap 85 in pivot end 45, end cap 85 having a vent 197 provided therein, vent 197 may further have vent tube 198 disposed therein providing release of entrapped air within leg 37 upon alighting upon deployment surface 90. Foot 48 of leg 37 is spring loaded within leg 37 for absorbing shock for multiple hazard marker 10 when deployed upon deployment surface 90. Foot 48 is generally a solid shaft of a diameter to pass freely within leg 37, foot 48 having a slot 187 in its lower end 199 adapted to receive toe 49 therein. Foot 48 is fitted onto leg 37 through a hole 189 in cap sleeve 188 and held thereon by an enlarged sleeve bushing 183, bushing 183 larger than hole 189 in cap sleeve 188. Bushing 183 is shrink fitted upon foot 48 in a manner similar to that known to affix gimbal 51 onto mast 18. Toe 49 is held onto lower end 199 of foot 48 by roll pins 181 driven through holes 186 in foot 48 and holes 185 through toe 49. Toe 49 is an arrow point 182, a flat piece of metal having a point 98. Leg 37 has a spring 190 disposed in bore 97 with upper end 192 bearing against pivot sleeve 43 and lower end 191 bearing against bushing 183. When loaded in cartridge 120, foot 48 typically has very little preload upon spring 192 as spring 190 has a free length substantially equal to the distance from leg pin 41 to bushing 183. Bushing 183 is substantially the same external diameter as bore 97 and thus has a sliding fitting relationship therewith providing shock absorbing capabilities upon deployment of multiple hazard marker 10. As is readily apparent, bushing 183 has a frictional sliding engagement with bore 97 providing some shock absorbing, but cooperates with vent 197 in end cap 85 to provide pneumatic shock absorbing as well. Therefore, when foot 48 engages deployment surface 90, entrapped air within leg 37 is controllably released through vent 197 providing the aforementioned pneumatic shock absorbing capabilities. The diameter of vent 197 and or vent tube 198 may be altered to provide more or less shock absorbing as is well known in the art. Furthermore, vent tubes 198 of each of legs 37 may be interconnected to provide for greater shock absorbing capabilities especially when one at least one of legs 37 engages deployment surface 90 in advance of another of legs 37 thus creating a positive pressure atop bushings 183.

Referring again to FIGS. 4a, 4b and 4c, multiple hazard marker 10 is assembled by shrink fitting gimbal 51 onto mast 18 spaced from lower end 20 approximately one fourth the length 30 of mast 18 and affixing support plate 38 to base mounting plate 50 with screws 52 passed through holes 55 in support plate 38 and screwed into holes 54 in base mounting 15 plate 50. Upper end 19 of mast 18 is then inserted through mounting hole 76, 77 from surface 71 of base mounting plate 50 having gimbal 51 aligned with mounting hole 76, 77 and press fitted therein. Housing 31 is affixed to lower end 20 of mast 18 by threading a counterweight 87 upon a threaded portion 88 of lower end 20 and affixing housing 31 thereto. Counterweight 87 is a significant mass and may be utilized alone to provide the righting moment for mast 18 or may be utilized with housing 31 as counterweight 87 has means thereupon for mounting electronic integrated circuitry, sensing elements, light bulbs, receivers and transmitters and has a threaded bore 89 aligning with bore 29 of mast 18 for passing wiring or sensing tubing therethrough.

Referring now to FIG. 6, lighting lens 24 may comprise separate bulbs of different colors, such as red, green and yellow having separate wires connected thereto, but as best shown in FIG. 6, lighting lens 24 may also be a hemispherically polished end 35 of a fiber optic cable 33 having an opposite end 34 divided into separate strands grouped for illumination by separate light bulbs 32, light bulbs 32 controlled by circuits mounted on integrated circuit boards 91. Light bulbs 32 are each a different color, one each for red, green or yellow, red signifying warning, green indicating no hazard or safe, and yellow for hazard. Lighting lens 24 provides significant illumination such that the indicating lights represented by the three colors may be observed from outside a hazard warning area and therefore, when no hazard is indicated, may guide personnel and vehicles through a previously hazardous area. Of course, when a hazard is indicated by the yellow or red light emitted through lens 24, personnel and vehicles are warned thereby to avoid the area marked by those multiple hazard markers 10. Other colored lights, including white, may be added to lens 24 by further dividing fiber optic cable 33 at end 34 or by having a multiple colored wheel rotationally indexed for passing before any of light bulbs 32. For instance, a white light may be utilized as means for signaling 36 to indicate that multiple hazard marker 10, 10A is in a sampling mode or has not yet determined the status of the area being marked.

Optionally, lighting lens 24 may be a separate lamp housing (not shown) similar to housing 31 adapted to be affixed to terminal end 23 of mast 18 or terminal end 23' of flag carrying tube 169. As such, the separate lamp housing may contain separate light bulbs 32 for the distinct indicating colors and also may contain sensors for environmental sampling for chemical, biological or atmospheric conditions and may further contain a separate set of electronic circuit boards 91 acting independently of circuit boards 91 in housing 31. An on-board feed-forward, back propagation neural network will be integrated into circuit board 91 and be capable of processing the multiple sensory outputs which will allow a single multiple hazard marker 10, 10A to continuously monitor for multiple hazards and relay the information regarding the samples to remote receivers. Thus, multiple hazard marker 10, 10A will help to manage and enhance the three principal approaches to mitigation of the military environmental life-cycle-survivability issues: detection, warning, and assisting the friendly forces on the ground, in the water and in the air.

During assembly of multiple hazard marker 10, polished end 35 of fiber optic cable 33 is passed through threaded bore 89 into bore 29 of mast 18, end 35 terminating just slightly above terminal end 23. Terminal end 23 may further have a cover 92 affixed thereto by inserting into bore 29 or fitting over outer surface 28 and being secured in fluid tight engagement therewithin or thereonto. Cover 92 is adapted to be transparent such that the signal lights of means for signaling 36 emitted by polished end 35 of cable 33 may readily pass therethrough. Ends 34 are fixed in proximity to bulbs 32 or a colored wheel as hereinbefore mentioned upon structure associated with counterweight 87. In like manner, transmitting antenna 26 and receiving antenna 25 are affixed to upper end 19 such as by winding a wire for each antenna about outer surface 28 and electrically isolating one from the other with an insulating sleeve 27. Receiving antenna 25 is an aluminum or steel tube identical to the tube used for mast 18 and, in fact, comprises upper end 19 of mast 18 while transmitting antenna 26 is a mid portion 146 of mast 18. Insulating sleeve 27 is formed from a thermoplastic material such as polyethylene, polypropylene or nylon and is greater in outside diameter than mast 18 and has a bore equal to outside diameter 78 such that receiving antenna 25 and transmitting antenna 26 are received therein. Connecting wire for antennas 26, 27 is then routed downwardly inside bore 29 of mast 18 to interconnect with appropriate circuits on circuit boards 91. A portion 21 of upper end 19 of mast 18 is then coated with a phosphorescent or luminescent coating 22. Portion 21 may comprise the entire length of mast 18 but usually a three inch long portion 21 is coated near terminal end 23 of upper end 19.

When flag carrying tube 169 is desired to be used, tube 169 is selected to be just slightly larger in internal diameter than the outside diameter of mast 18 and is therefore slidably engaged thereupon. A slot 170 is provided through the wall 171 of tube 169, slot 170 beginning above a lower end 172 of tube 169 and extending approximately one half the length thereof. Slot 170 is of a width to allow free sliding along a fixed pin 167 driven through hole 166 in upper end 19 of mast 18. Flag 155 is wrapped around flag tube 169 and secured thereto with the hook and loop fastener provided on surface 179 of flag 155. Spring 168 is then inserted into flag carrying tube 169 and flag tube 169 is fitted around mast 18 and pressed downwardly thereonto. Roll pin 167 is then inserted through slot 170 into hole 166 extending beyond an outer surface 28' of flag tube 169. Spring 168 disposed within flag carrying tube 169 has upper end 174 bearing against the inside of a closed terminal end 23' while lower end 175 of spring 168 bears against terminal end 23 of mast 18 or roll pin 167. Upon release of flag tube 169, tube 169 moves upwardly under pressure of spring 168 engaging roll pin 167 against bottom 173 of slot 170. A portion 21' of upper end 19' of flag tube 169 may then be coated with a phosphorescent or luminescent coating 22'. Portion 21' may comprise the entire length of tube 169 but usually a three inch long portion 21' is coated near terminal end 23' of upper end 19'. Tube 169 may also be transparent such that lighting lens 24 may be observed therethrough.

Referring now to FIG. 4c, legs 37 are generally circular tubes having an outer surface 81 and a bore 97 and are at least two feet long from deployment surface engaging end 44 to pivot end 45. Each leg 37 is fitted with a foot 48 on deployment surface engaging end 44 by inserting foot 48 into hole 189 of end cap 188 having end 199 extending outwardly of leg 37. Foot 48 has previously had bushing 183 shrink fitted upon end 200 thereof and after insertion through end cap 188, toe 49 is inserted into slot 187 and affixed thereto by driving pins 181 through holes 186, 185. Spring 190 is inserted into bore 97 and end cap 188 screwed onto leg 37 with upper end 200 of foot 48 bearing against lower end 191 of spring 190. In FIGS. 4a, 4b and 4c described above, foot 48 is inserted into bore 97 having end cap 188 screwed onto threaded end 196 but end cap 188 could, of course, be press fitted into bore 97 or internally threaded therein.

Now referring to FIG. 4a, legs 37 are each assembled to support plate 38 by inserting pivot end 45 into slot 39 with deployment surface engaging end 44 extending away from base mounting plate 50 in the same direction as lower end 20 having counterweight 87 thereupon. Each leg 37 is affixed to support plate 38 by passing a leg pin 41 through one lobe 60 in ear 58, through pivot hole 84 in one side of pivot sleeve 43, into other lobe 60 and affixing leg pin 41 thereonto by threading nut 180 onto threaded portion 63 of leg pin 41. Alternatively, one lobe 60 may have pivot hole 40 internally threaded for receiving threaded portion 63 of leg pin 41 thereinto. Similarly, leg pin 41 may have a smooth outer periphery and secured to ears 58 by using a roll pin driven through a cross bored hole formed through support plate 38 intersecting leg pin 41 in a notch formed in leg pin 41. A roll pin would prevent leg pin 41 from rotating and from being removed from leg pin holes 40 thereby preserving the integrity of the leg 37 assembly with support plate 38. After legs 37 are assembled to ears 58, a lanyard 47 is affixed to stop 46 on each of legs 37, lanyard 47 having a length between each stop 46 to allow each of legs 37 to generally be deployed at an angle of forty-five (45) degrees from centerline 53. Thus, referring now to FIG. 2, multiple hazard marker 10 is adapted to be deployed upon deployment surface 90 in a triangular configuration with legs 37 forming a tripod base from support plate 38 to deployment surface 90 with mast 18 extending upwardly from support plate 38. As mast 18 is rotatably disposed in support plate 38 and base mounting plate 50 by gimbal 51, mast 18 assumes a vertical orientation without regard to the configuration of deployment surface 90.

Referring to FIGS. 2, 4a and 4c, legs 37 have means for expanding 12 associated therewith and hence are biased in an outward orientation by a biasing element 95 such as a leaf or torsion spring 96 to assist legs 37 in deploying outwardly to form tripod base for multiple hazard marker 10. A spring coupler 193 having a shaft hole 194 in the center thereof is disposed about leg 37 having spring holes 195 facing upwardly toward base mounting plate 50. Torsion springs 96 are then disposed on both sides of leg 37 having an one end 201 inserted into spring hole 195 in spring coupler 193. Spring coupler 193 is then moved upwardly toward release plate with spring 96 biased toward a deployment position until other end 202 of torsion spring 96 may be inserted into a spring hole 203 in sides 69 of base mounting plate 50. Spring coupler 193 may then be secured to leg 37 by a set screw through the minor diameter thereof engaging an outer surface 81. Thus, leg 37 is biased outwardly upon deployment.

Stop 46 may be disposed at any point along leg 37 from deployment surface engaging end 44 to pivot end 45 but is best placed approximately midway therebetween. Finally, end cap 85 may be affixed to pivot end 45 by inserting same within bore 97 or encircling outer surface 81 therewith and securing end cap 85 thereto or by threading onto threaded end 45 of leg 37.

Multiple hazard marker 10 and/or multiple hazard marker 10A may be used to mark a breach in a minefield after the breach is established such as with a mine plow attached to a military tank. Multiple hazard marker 10, 10A may be deployed upon deployment surface 90 alongside either or both sides of the breach to mark a clear pathway through the minefield. When used to mark a breach through a minefield or to mark other hazards from a ground based deployment vehicle, multiple hazard marker 10, 10A is deployed from cartridge tube 120 through open lower end 121 by gravity feed assisted by spring 168 in flag carrying tube 169 when used. As best observed in FIG. 3, multiple hazard marker 10 is collapsed within cartridge tube 120 but after release therefrom, legs 37 tend to splay outwardly forming a tripod base when feet 48 engage deployment surface 90. In a like manner, as observed in FIG. 9, multiple hazard marker 10A is shown in a collapsed state with legs 37A folded upon housing 31A but after release from cartridge tube 120, and upon alighting upon deployment surface 90, legs 37A are released from the folded position by release of leg catches 217 of means to expand 12A and spring outwardly becoming substantially parallel with deployment surface 90.

Figure 5:
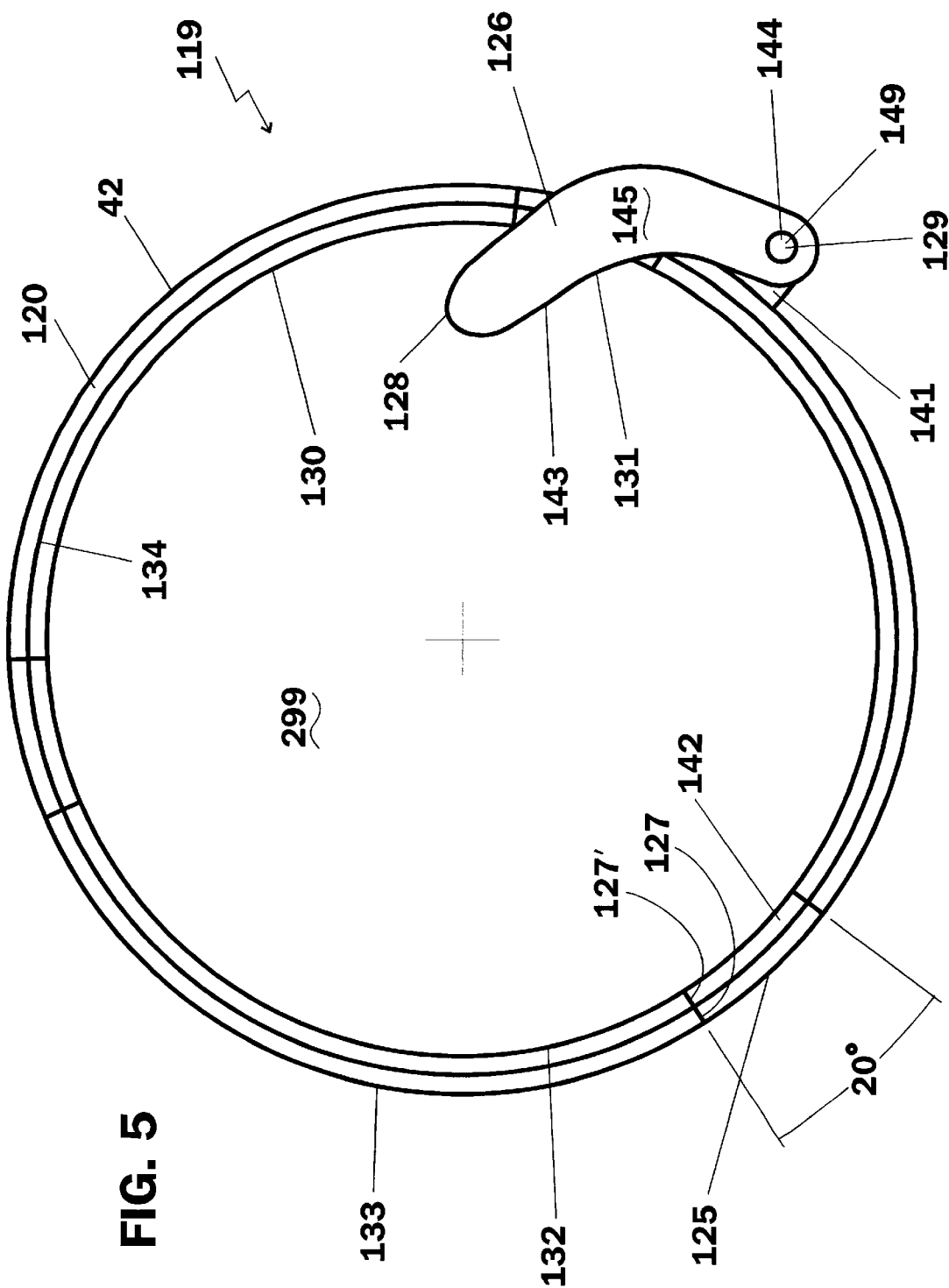
FIG. 5 is a top plan section view of the release mechanism of the multiple hazard marker system of FIG. 1 taken along line 5—5 of FIG. 3.

Referring now to FIG. 5 multiple hazard marker 10, 10A is retained within cartridge tube 120 upon a support end 128 of a catch 126 of a release mechanism 119 as support end 128 is adapted to engage bottom surface 71 of lower plate 50 or lower surface 255 of skid plate 99 of multiple hazard marker 10, 10A respectively. Catch 126 is disposed through an aperture 125 formed through cartridge tube 120 and internal sleeve 130, aperture 125 having a pivot edge 127 on cartridge tube 120 and pivot edge 127' on internal sleeve 130 for engaging catch 126 along a slide surface 131. Typically, three catches 126 are disposed through three apertures 125, apertures 125 spaced at an angular displacement of one hundred twenty degrees (120°). An annular ring 132 aligned vertically along cartridge tube 120 at apertures 125 and fitted over outer peripheral surface 133 of internal sleeve 130 engages each catch 126 at a release attachment point 129 and retains each catch 126 thereupon. In the release of multiple hazard marker 10, 10A, annular ring 132 is adapted to rotate in a direction to cause slide surface 131 to move along pivot edge 127 of aperture 125 withdrawing support end 128 from underneath lower surface 71, 255 thereby releasing multiple hazard marker 10, 10A from cartridge tube 120. In an alternate release method, internal sleeve 130 is adapted to rotate within inner surface 134 of cartridge tube 120 thereby moving pivot edge 127' of internal sleeve 130 against slide surface 131 of catch 126 causing catch 126 to withdraw support from lower surface 71, 255 in like manner to the above description. As will be readily apparent, internal sleeve 130 rotates in a direction opposite the direction annular ring 132 would rotate. Similarly, internal sleeve 130 and annular ring 132 may cooperate but rotating simultaneously in opposite directions to provide for a more rapid release of multiple hazard marker 10. Catch 126 may also capture support plate 38 and base mounting plate 50 in a slot in support end 128 such that multiple hazard marker 10, 10A will not slide out through upper end 122 if cartridge 120 is inadvertently inverted. More than one multiple hazard marker 10A may be readied for deployment in cartridge 120 by providing more than one release mechanism 119 for retaining each multiple hazard marker 10A.

Although multiple hazard marker 10, 10A may be used to mark a breach through a minefield as hereinbefore described, multiple hazard marker 10, 10A may also be used for biological or chemical sampling of the region around multiple hazard marker 10, 10A as housing 31 is adapted to house sampling sensors therein. While multiple hazard marker 10, 10A may be deployed from a ground engaging deployment vehicle 160 such as a tank for the marking of a minefield, multiple hazard marker 10, 10A may be deployed from deployment vehicles 160 in the air as well, multiple hazard marker 10, 10A having a parachute attached thereto for deploying from an aircraft where entry into the field to be marked may be hazardous to ground based personnel or vehicles. For instance, multiple hazard marker 10, 10A may be deployed by aircraft for marking the boundaries of a minefield wherein the mines in the field have been detected by ground penetrating radar, either mounted on a separate aircraft or combined on board with field marking system 150. The method of detecting mines by ground penetrating radar is discussed fully in the article by Earp, et al., entitled "Ultra Wideband Ground Penetrating Radar for Detection of Buried Metallic Mines", appearing in IEEE AES Systems, Vol. 11, No.9, September 1996. Another means of detecting mines in a minefield is described in the article "Flight Performance of an Airborne Minefield Detection and Reconnaissance System" by Andre G. Lareau, Photogrammetric Engineering & Remote Sensing, Vol. 57, No. 2, Feburary 1991, these articles incorporated herein by this reference thereto. In like manner, multiple hazard marker 10, 10A may be used by law enforcement personnel to detect the presence of methamphetamine laboratories operating in remote areas by dropping a multiple hazard marker 10, 10A from an aircraft in a suspected area and activating sensors within housing 31 to sample for the odors present in the manufacture of the illicit drug. Multiple hazard marker 10, 10A is adapted to engage deployment surface 90 in the same manner as occurs when deployed from a ground engaging vehicle as legs 37 of multiple hazard marker 10 move apart upon release from cartridge 120 from the aircraft or as legs 37A of multiple hazard marker 10A spring outwardly upon alighting upon deployment surface 90. Of course, a means for preventing expansion coupled with a proximity or time release means may be employed to cause expansion of legs 37 of multiple hazard marker 10 at a time or distance above the surface as desired.

Means for detecting, differentiating and neutralizing biological or chemical hazards have been described in numerous papers on the subject. For instance, Caffrey, et al., in the article "Chemical Warfare Agent and High Explosive Identification by Spectroscopy of Neutron-induced Gamma Rays", IEEE Transactions on Nuclear Science, Vol. 39, No. 5 present an identification algorithm for identifying and differentiating between high explosives and chemical warfare agents, the article by Caffrey, et al., incorporated herein by this reference thereto. Another biological agent detector is described by McGowan, et al., in their article "Biological Agent Detector using a Surface Transverse Wave Resonator Preliminary Report", 1994 IEEE MTT-S Digest, TU4D-4, incorporated herein by this reference thereto. Some sensors rely on molecular mass measurements to detect CW and BW agents. These include the Chemical Agent Monitor (CAM) and the Chemical and Biological Mass Spectrometer (CBMS). One proven chemical Agent Monitor is supplied by Graseby Dynamics, Ltd. Briefly, it is a portable and battery-operated hand-held unit, capable of detecting blister (HD, HN3) and nerve (GB, VX) gases at levels which are below NATO requirements. Detection of these CW agents is achieved using the very well established ionmobility mass spectrometer (IMS) technology. This technology has not only been successfully applied to CW detection, but is used extensively for environmental monitoring and industrial process monitoring.

Passive Fourier transform mid-infrared spectrometers (FT-IR); frequency agile mid-infrared carbon dioxide, ultraviolet fluorescence, 1.06 micron, and 2.0 micron lidar systems; mid-infrared Mueller matrix ellipsometers; immunoassay coated fiber-optics and hybrid active-passive mid-infrared thermoluminescence spectrometer sensors rely on optical measurements to detect CW and BW agents. Whether using optical or molecular mass measurements, sampling for key indicators as described in the aforementioned articles may be accomplished within housing 31, 31A, the results of the sampling being transmitted by a means for signaling 36 associated with integrated circuit boards 91. As best shown in FIG. 6, means for signaling 36 comprises at least a switching means 135 associated with one of integrated circuit boards 91 having at least one light bulb 32 being illuminated by switching means 135 to indicate hazard or safety and may further comprise transmitting antenna 26 associated with mast 18 for transmitting to a remote station the presence of the various ions detected for further analysis by personnel at the remote station. A receiving antenna 25 also associated with integrated circuit boards 91 is adapted to receive signals from the remote station for activation of sampling sequences within housing 31. Receiving antenna 25 and transmitting antenna 26 are formed as a part of mast 18 and electrically isolated from each other by insulating sleeve 27 as on multiple hazard marker 10, however may be incorporated as a part of circuit board 91 as in multiple hazard marker 10A. Upon identification of the particular biological or chemical hazard, neutralizing agents may then be deployed in the proximity of the multiple hazard marker to effect neutralization of the hazard. Multiple hazard marker 10, 10A of course, is still available for continued monitoring of the immediate area to determine the efficacy of the countermeasures and to signal an all clear when the hazard has been eliminated. The journal article "Chemical Reactions for Neutralising Chemical Warfare Agents" by Yu-Chu Yang published in the May 1, 1995 issue of Chemistry & Industry details effective countermeasures, this article incorporated herein by this reference thereto.

In like manner, multiple hazard marker 10, 10A may be utilized in hostile environs to measure temperature, ground movement and gases such as emitted from a volcano. Referring back to FIG. 4, displacement sensors 136 may be made a part of support plate 38 and/or base mounting plate 50 which are positioned for contact against legs 37. Movement of any leg 37 relative to support plate 38 or base mounting plate 50 is transmitted to a remote location via transmitting antenna 26. Similarly, temperature sensors 154 may transmit temperature information on a real time basis through integrated circuit boards 91 and transmitting antenna 26. Identification of gases expected from a volcano may be accomplished by changing the gas identification algorithm previously described for biological or chemical warfare gases. Monitoring of a larger scale fault line may be accomplished with displacement sensors 136 as described above and the information transmitted to the remote station. The locations of each of multiple hazard markers 10, 10A may be achieved by geopositional satellite (GPS) identification using a signal transmitted from each of multiple hazard markers 10, 10A or by an identification code established within each receiver 137 of FIG. 6. Similarly, the magnitude of a force generated with the ground movement may be determined by using the mass of housing 31, integrated circuit boards 91 and counterweight 87 as a pendulum mass and measuring the period of the pendulum swing associated with the movement Thus, a displacement sensor 136 may be associated with support plate 38 and mast 18 to determine the period of the pendulum swing. A stimulant parameter may be induced into displacement sensor 136 to assist in differentiating seismic activity from ambient activity. An initialization sequence is programmed into integrated circuit boards 91 and activated by sending the initialization command through receiving antenna 27 to receiver 137 in housing 31. Therefore, the real time information determined by multiple hazard marker 10, 10A and transmitted to the remote station removes personnel from hazardous environs while still permitting gathering of valuable information. Likewise, use of multiple hazard marker 10, 10A in space exploration is possible by outfitting housing 31, 31A with sensors to detect and/or measure desired information on space objects. Of course, multiple hazard marker 10, 10A could be suspended by a weather balloon for measurement of atmospheric data while aloft and measurement of environmental data after returning to the earth's surface. The inclusion of GPS locators thereafter pinpoints the location of multiple hazard marker 10.

Housing 31 may further house proximity or presence sensors to detect movement within the proximity of the multiple hazard marker 10, 10A by measuring the change in capacitance of the field generated by the sensor. Detecting movement has obvious connotations in military usage, however, detecting movement of personnel within a previously identified hazardous area can alert medical personnel to the location of victims of the hazard and effect removal of these victims therefrom. Sensors for detecting water level in a flooded plain may be housed in legs 37, 37A as other sensors may be mounted upon support plate 38, 38A or base mounting plate 50, 50A as desired for detecting or measuring other environmental parameters. Sensors for detecting buried power and fluid transmission lines may be included in housing 31, 31A for marking the locations of these systems. Furthermore, multiple hazard markers 10, 10A may be used to mark the construction zones, surveying sites, fire zones and blasting zones utilizing means for marking 16 by deploying a quantity of multiple hazard markers 10, 10A as needed for indicating the presence of these hazards. Sensors hereinbefore described as useful and other sensors which may be utilized with multiple hazard marker 10, 10A for other purposes are fully described in the textbook *Sensors and Circuits* by Joseph J. Carr, published by Prentice-Hall, Englewood Cliffs, N.J., 1993, incorporated herein by this reference thereto. Gas sensors particularly useful in multiple hazard markers 10, 10A are Taguchi Gas Sensors manufactured by Figaro, USA, Inc. Such gas sensors can detect very low level concentrations of various gases present in chemical warfare systems by measuring a resistance across a metal oxide or ceramic oxide surface and will recover to original resistance upon removal of the toxic gas. The gas sensors must fulfill many exploitation requirements; the most important parameters are: sensitivity, selectivity, reading reproducibility, stability during the operation, quick response, small size safety operation, low power consumption, ~15 mW, and low cost. The resistance of the gas sensors used in multiple hazard markers 10, 10A, is changed very quickly when exposed to a gas, and when removed from the gas, its resistance will recover to its original value after a short time. The speed of response and reversibility will vary according to the model of sensor and the gas involved, however the typical response time is within a few seconds.

Referring again to FIG. 1 and 3, the multiple hazard marker system 150 of this invention comprises a means for deploying 100 mounted upon a deployment vehicle 160, means for deploying 100 having a multiple hazard marker 10, 10A therein. Mounting bracket 103, generally horizontally disposed upon deployment vehicle 160, is formed from a channel 102 having upright edges 111, 112 on either edge of a base 138 forming an open channel 108 therebetween, channel 102 generally formed from a five inch steel channel iron wherein upright edges 111, 112 are approximately one and one half inches in height. A mounting bar 101 is formed from a box channel, open channel or solid bar stock and is firmly affixed to deployment vehicle 160 by bolting or welding one side thereto. Match drilled through upright edges 111, 112 of mounting bracket 103 and mounting bar 101 are multiple one half inch diameter openings 105 and 106 respectively, for receiving attachment pins 104 therein. Attachment pins 104 are formed from six inch long, one half inch diameter, hardened steel cylindrical pins having a head on one end and a snap catch on the other end, however pins 104 may be half inch diameter bolts adapted to be inserted through openings 105, 106 and secured therein with nuts on the open thereof. Channel 102 is adapted to slide longitudinally along mounting bar 101 for extending or retracting means for deploying 100 therealong in order to place means for deploying 100 at further or closer orientations to an edge 161 of deployment vehicle 160. Three mounting openings 105, 106 are shown in each of channel 102 and mounting bar 101 respectively, however, it is to be understood that openings 105 and/or 106 may be disposed along the entire length of channel 102 or mounting bar 101 to provide for a greater number of longitudinal orientations.

In the embodiment shown in FIG. 7, cartridge tube 120 is preferably formed from Schedule 40 cold rolled steel tube having an inside diameter 123 of five and one half inches having a five inch inside diameter thermoplastic tube inserted therein and is affixed to the terminal end 107 of channel 102 in an orientation to provide for vertical deployment of multiple hazard marker 10 therefrom. The steel tube of cartridge tube 120 is cut into two sections, one section thirty inches in length from lower end 121 to annular ring 132 and a second section at least fifteen inches in length disposed above annular ring 132 while the thermoplastic tube extends from lower end 121 to upper end 122. The thermoplastic tube is a commercially available five inch inside diameter Schedule 40 thermoplastic water pipe approximately five feet in length and is frictionally fitted within the steel tube and secured thereto with bolts (not shown) extending through the steel tube into threaded holes (not shown) in the wall of the thermoplastic tube. A commercially available five and one half inch inside diameter thermoplastic end cap 59 is frictionally fitted upon upper end 122 and may further be secured thereto with additional bolts (not shown). Cartridge tube 120 is generally mounted at a right angle to channel 102 and may be welded to one end thereof having lower end 121 disposed slightly below the lower surface 158 of mounting bar 101. Channel 102 is generally oriented downwardly and is partially removed from FIG. 7 to show mounting bar 101 therewithin. Referring also to FIG. 3, length 124 of cartridge tube 120 is generally at least the length of a collapsed multiple hazard marker 10, 10A such that multiple hazard marker 10, 10A assumes a vertical orientation within cartridge 120 and is therefore, is at least three feet and preferably approximately five feet from upper end 122 to lower end 121. Upright standards 110 and angled support braces 109 are formed from one quarter inch thick, two inch wide cold rolled steel bar and welded to channel 102, upright standards 110 extending upwardly at a right angle from each upright edge 111, 112 of channel 102 approximately one half the length 124 of cartridge 120. Two inch square, one quarter inch thick steel pads 116 are welded to upright edges 111, 112 of channel 102 and angled support braces 109 have one end 113 welded to pads 116 at an angle of approximately 45 degrees while opposite end 115 thereof is welded to upright standards 110 having ends 115 extending alongside cartridge 120 and further welded thereto. Support plate 117 is welded to upright standards 110 at the upper ends 118 thereof, ends 115 of angled support braces 109 protruding through holes 114 in support 117 and welded thereto. Support plate 117 generally extends above upper ends 118 of upright standards 110 providing more support to cartridge 120. Plate 117 may be welded to cartridge 120 along the length thereof but preferably, cartridge tube 120 is affixed to support 117 by U-bolts having threaded ends which pass through holes in support 117, such holes being formed in pairs for accepting the ends of U bolts therein, some of these pairs being disposed at an angle to the vertical axis of means for deploying 100 such that multiple hazard marker 10, 10A may be deployed at a slight angle to the vertical to ensure that toe 49 on one leg 37 positively engages deployment surface prior to any of other legs 37. For instance, one of these pairs of holes is oriented at an angle of 15 degrees from the horizontal and yet another of these pairs of holes is oriented at an angle of 30 degrees from the horizontal to compensate for the forward speed of deployment vehicle 160 such that multiple hazard marker 10 may alight upon deployment surface 90 with a trailing leg 37 prior to leading legs 37. It is to be understood here that a trailing leg 37 is a leg 37 disposed aft of centerline 53 in the direction of movement of deployment vehicle 160.

Cartridge tube 120 has both ends 121, 122 open for ease of loading and deploying of multiple hazard markers 10, 10A with lower end 121 disposed approximately seven feet above deployment surface 90. Thus, as multiple hazard marker 10 is deployed from cartridge tube 120 of means for deploying 100, a means for expanding 12 associated with a central portion 13 of multiple hazard marker 10, 10A forms a means for remaining erect 14 associated with a surface engaging portion 15 of multiple hazard marker 10. Cartridge tube 120 has an annular ledge 139 formed on inner surface 134 at lower end 121 for accepting an end 140 of internal sleeve 130, annular ledge 139 welded to inner surface 134. End 140 of internal sleeve 130 is machined square with the longitudinal axis of internal sleeve 130 and adapted to rotate upon annular ledge 139. In the preferred embodiment, internal sleeve 130 and tube 120 are secured together with machine screws passed through tube 120 into threaded holes in sleeve 130, the screws terminating in sleeve 130.

Referring now to FIGS. 3 and 5, apertures 125 and 142 are formed through annular ring 132 and internal sleeve 130 respectively, and are spaced at an angular displacement of one hundred twenty degrees (120°). Apertures 125 have a pivot edges 127 in annular ring 132 and 127' in internal sleeve 130 for engaging slide surface 131 of catch 126 disposed therethrough. Annular ring 132 is a three inch wide ring of steel having an inside diameter approximately equal to the outside diameter of inner sleeve 130 and is aligned vertically along inner sleeve 130 at apertures 142. Annular ring 132 has release attachment points 129 on an upper edge 141 of a boss 149, boss 149 affixed to the outer periphery 42 of annular ring 132, each catch 126 retained on an attachment pin 144 at release attachment points 129. Catches 126 are biased inwardly through apertures 125 toward inside surface 134 and into internal volume 299 of cartridge 120 to retain multiple hazard marker 10, 10A therein upon a support end 128 of a catch 126. Catch 126 is formed of a one and one quarter inch thick steel arm having a curved slide surface 131 formed on the inside surface 143 thereof, catch 126 having support end 128 on one end and release attachment point 129 on the other end thereof. Release attachment point 129 is drilled through catch 126 and reamed for receipt of attachment pin 144 of annular ring 132 therein while support end 128 is machined flat on the upper surface 145 of catch 126. Support end 128 is adapted to engage lower surface 71 of base mounting plate 50 at apices 73 thereof, however, catch 126 may have an eleven sixteenths inch wide slot (not shown) disposed in support end 128 thereof capturing support plate 38 and base mounting plate 50 therein and thus this slot overlies upper surface 66 and engages bottom surface 71. In the release of multiple hazard marker 10, annular ring 132 rotates in a direction, clockwise as viewed in FIG. 5 from upper end 122 of cartridge 120, to cause slide surface 131 to move along pivot edge 127 of aperture 125 withdrawing support end 128 from underneath lower surface 71 thereby releasing multiple hazard marker 10, 10A from cartridge tube 120. In an alternate release method, internal sleeve 130 is adapted to rotate counterclockwise as viewed from upper end 122 within inner surface 134 of cartridge tube 120 thereby moving pivot edge 127' of internal sleeve 130 against slide surface 131 of catch 126 causing catch 126 to withdraw support from lower surface 71 in like manner to the above description. Similarly, internal sleeve 130 and annular ring 132 may cooperate by rotating simultaneously in opposite directions to provide for a more rapid release of multiple hazard marker 10. Annular ring 132 may be rotated by a hand release mechanism by pulling tangentially from one of release attachment points 129 but usually, annular ring 132 is rotated remotely having an actuating means associated with at least one release attachment point 129. An actuating means may be a pneumatic, electric or hydraulic cylinder adapted to move release attachment point 129 in a releasing direction.

As best seen in FIGS. 2 and 4, multiple hazard marker 10 has an upper portion 17 comprising elongated mast 18 having an upper end 19 and a lower end 20. Elongated mast 18 is formed from one half inch outside diameter, hollow aluminum or steel tube having an outside surface 28, a bore 29 and a length 30 as measured from terminal end 23 to lower end 20. Mast 18 may also be a telescoping tube of several sections having an extended length equal to length 30, each section of the telescoping tube made successively smaller in diameter than the immediately preceding tube. Upper end 19 has means for marking 16 comprising at least a luminescent or phosphorescent coating 22 on a portion 21, phosphorescent coating 22 applied to outside surface 28 of upper end 19 by dipping portion 21 in a luminescent or phosphorous paint or by wrapping an adhesive backed phosphorescent or luminescent tape therearound. Identification flag 155 formed from a weather resistant fabric or themoplastic sheet and having indicia 156 thereupon may further be affixed to upper end 19 of mast 18 by means known in the art. Flag 155 or indicia 156 may also be made luminescent or phosphorescent. Means for marking 16 may further comprise a lighting lens 24, shown in FIG. 6, associated with terminal end 23, lighting lens 24 illuminated by one of electrically actuated light bulbs 32. Lighting lens 24 may comprise separate bulbs of different colors, such as red, green and yellow having separate wires connected thereto, but in the preferred embodiment, lighting lens 24 is a hemispherically polished end 35 of a fiber optic cable 33 having an opposite end 34 divided into separate strands grouped for illumination by separate light bulbs 32, light bulbs 32 controlled by circuits mounted on integrated circuit boards 91. Light bulbs 32 are each a different color, one each for red, green or yellow, red signifying warning, green indicating safe, and yellow for hazard and a constant source rather than a pulsating strobe for enhanced use in limited visibility. Lighting lens 24 provides significant illumination such that the indicating lights represented by the three colors may be observed from outside a hazard warning area and therefore, when no hazard is indicated, may guide personnel and vehicles through a previously hazardous area. Of course, when a hazard is indicated by the yellow light emitted through lens 24, personnel and vehicles are warned thereby to avoid the area marked by those multiple hazard markers 10. Other colored lights, including white, may be added to lens 24 by further dividing fiber optic cable 33 at end 34 or by having a multiple colored wheel passing before any of light bulbs 32. For instance, a white light may be utilized to indicate that multiple hazard marker 10, 10A is in a sampling mode or has not yet determined the status of the area being marked. A clear, transparent thermoplastic cover 92 may be fitted into terminal end 23 of mast 18 by inserting into bore 29 or fitting over outer surface 28 and being secured in fluid tight engagement therewithin or thereonto. For instance, thermoplastic cover 92 may have a threaded exterior portion for threading into a threaded end of terminal end 23 or may have a reduced diameter end for friction fitting within bore 29 mast 18 or may have an internal diameter equal to the outside diameter of outside surface 28 of mast 18 for gluing cover 92 thereonto. Means for marking 16 may be readily observed by personnel on foot or in vehicles as terminal end 23 is adapted to be disposed at least five feet above deployment surface 90. Optional separate lamp housing containing lighting lens 24 is a light weight two inch outside diameter, six inch long aluminum or steel can having a dosed end and an open end similar to housing 31 and is affixed to terminal end 23 of mast 18 or terminal end 23' of flag carrying tube 169 with another counterweight similar to counterweight 87, however is not a significant mass as is counterweight 87 and thus the mass of separate lamp housing and separate counterweight does not significantly affect the righting moment provided by counterweight 87 and housing 31. The separate lamp housing contains separate light bulbs 32, separate sensors for environmental sampling and separate electronic circuit boards 91 all acting independently these respective components contained in housing 31. Lighting lens 24 may be made a portion of the closed end of the separate lamp housing or may have lens apertures through the outer wall thereof for multiple hazard marker 10 or may be integral with mast 18A of multiple hazard marker 10A.

Upper end 19 has receiving antenna 25 and transmitting antenna 26 associated therewith, receiving antenna 25 electrically isolated from transmitting antenna 26 by insulating sleeve 27. Receiving antenna 25 is an aluminum or steel tube identical to the tube used for mast 18 and, in fact, comprises upper end 19 of mast 18 while transmitting antenna 26 is a mid portion 146 of mast 18. Insulating sleeve 27 is formed from a thermoplastic material such as polyethylene, polypropylene or nylon and is greater in outside diameter than mast 18 and has a bore equal to outside diameter 78 such that receiving antenna 25 and transmitting antenna 26 are received therein. Insulating sleeve 27 has an internal ring separating receiving antenna 25 and transmitting antenna 26. Receiving antenna 25 and transmitting antenna 26 are electrically connected to receiving and transmitting portions of integrated circuit boards 91 respectively by wires which are run downwardly through bore 29 of mast 18. Multiple hazard marker 10, 10A contains a command signal impulse actuator 93 associated with integrated circuit boards 91 that is capable of receiving signal, code and frequency to the multiple hazard marker 10, 10A in the cartridge to change the color of electronic light 32 to indicate hazardous material with a yellow light, to red for warning, to green for safe. Multiple hazard marker 10, 10A has a battery that provides power to the command signal impulse actuator, an integrated current receiver command module 94, light bulbs 32 and circuit boards 91. Command signal impulse actuator 93 and integrated current receiver command module 94 therefore, comprise a means for changing 86 to receive instructions from a remote unit or act in response to a detected hazard to modify means for signaling 36 accordingly.

Referring particularly now to FIG. 4b, lower end 20 of mast 18 has counterweight 87 threaded thereonto and may also have an instrument housing 31 affixed to counterweight 87. Counterweight 87 provides a righting moment to elongated mast 18 such that mast 18 is always substantially vertical after multiple hazard marker 10, 10A is fully deployed upon deployment surface 90. Housing 31 is a hollow metal container having a lower end 147 and an upper end 148, upper end 148 having threads thereon for threading upon a threaded flange 151 of counterweight 87. Counterweight 87 is a die cast metal, three kilogram weight having a threaded bore 89 centrally disposed therein which is affixed to lower end 20 of mast 18 by threading onto counterweight 87 upon a threaded portion 88 of lower end 20. Counterweight 87 further has a threaded flange 151 at its outer periphery for accepting housing 31 thereupon. The significant mass of counterweight 87 provides the righting moment for mast 18. Counterweight 87 has slots formed upon the lower surface 153 thereof for mounting the components of means for signaling 36, such as electronic circuitry, power supplies, sensing elements, light bulbs, receivers and transmitters, threaded bore 89 aligning with bore 29 of mast 18 for passing wiring or sensing tubing therethrough. A battery generally supplies power to command signal impulse actuator 93, integrated current receiver command module 94, light bulbs 32 and integrated circuit boards 91, however, counterweight 87 or housing 31 may additionally have a solar array mounted thereon for generating electrical power.

Referring now to FIG. 4a, gimbal 51 is a preferably a brass, bronze or thermoplastic spherical bearing in a bearing assembly approximately one and one half inches in outside diameter having a one half inch hole bored therethrough for receiving mast 18 therein. Support plate 38 has mounting hole 76 bored centrally therein for receiving gimbal 51. Mast 18 is thus pivotally supported in gimbal 51 mounted in support plate 38 and base mounting plate 50 on centerline 53 of multiple hazard marker 10, central portion 13 joining upper portion 17 to surface engaging portion 15. Gimbal 51 therefore, has a hole 75 substantially the same diameter as outer diameter 78 of mast 18 through its geographic center for receiving mast 18 therethrough and has mast 18 firmly affixed therein. Typically, gimbal 51 is a spherical bearing and may be expanded by heating, or mast 18 may be supercooled, prior to sliding mast 18 therein. Thus, hole 75 is expanded along with gimbal 51, or mast 18 reduced in diameter, and after inserting mast 18 to its desired location within gimbal 51, gimbal 51 and mast 18 are allowed to return to ambient temperature thereby rigidly affixing gimbal 51 to mast 18. As gimbal 51 is free to rotate, mast 18 always assumes a vertical orientation without regard to the contour of deployment surface 90.

As best observed in FIG. 4a, support plate 38 is a six sided figure which is formed from a four and one half inch diameter, one half inch thick, flat metallic plate, preferably aluminum, but may be steel or another structural material and in the preferred embodiment, and has outer diameter 57 partially cut away to inner diametral surface 56 and triangular sides 83 with leg slots 39 disposed within protruding ears 58, ears 58 centrally disposed on triangular sides 83. Ears 58 extend from triangular sides 83, to outer diameter 57 while leg slots 39 extend inwardly from outer diameter 57 beyond inner diametral surface 56 substantially to triangular sides 83. Inner diametral surface 56 is approximately three and one half inches in diameter and leg slots 39 are approximately three quarters inch deep from outer diameter 57. Triangular sides 83 meet at inner diametral surface 56 in truncated apices 68. Support plate 38 may alternately be described as a triangular plate having ears 58 protruding from sides 83 thereof. Leg slots 39 are approximately seven eighths inch in width between lobes 60. Leg pin holes 40 are formed perpendicular to leg slots 39 through lobes 60 of ears 58 by drilling a one quarter inch hole from one outer edge 178 of one lobe 60 through each lobe 60 and, if desired, counter boring one end of each leg pin hole 40 with a counter bore 62 for accepting head portion 64 thereinto at assembly. The opposite lobe 60 has threaded hole 65 disposed about leg pin hole 40 for receiving threaded portion 63 of leg pin 41 therein. In the preferred embodiment, threaded portion 65 is omitted and leg hole 40 is a smooth bore through both lobes 60. Socket head cap screws 61 having mating nuts 180 threaded onto threaded portion 63 thereof have nuts 180 disposed against an outer edge 178 of one lobe 60 while head portion 64 bears against outer edge 178 of the other lobe 60. Carriage bolts or machine bolts having a head portion 64 and a threaded portion 65 may also be used in place of socket head cap screws 61. Upper end 19 of mast 18 may then be inserted through mounting hole 76, 77 from surface 71 of base mounting plate 50 having gimbal 51 aligned with mounting hole 76, 77 and press fitted therein. Since mast hole 76 is larger in diameter than mast 18, mast 18 is readily rotatable therewithin after assembly of multiple hazard marker 10.

Base mounting plate 50 is formed as an equilateral triangle from a five eighths inch thick, flat metallic plate, preferably aluminum but may also be steel or another structural material, and has truncated apices 73 at the juncture of each of sides 69, the altitude from each side 69 to each opposite apex 73 being approximately two and one half inches. Apices 73 are curved surfaces 72 corresponding in diameter to inner diametral surface 56 of support plate 38, curved surfaces 72 extending between ears 58 upon assembly of base mounting plate 50 to support plate 38. Threaded holes 54 are drilled and tapped with #10–24 thread into each apex 73 one quarter inch inwardly from apex 73 for affixing base mounting plate 50 to support plate 38. Base mounting plate 50 has upper surface 70 and bottom surface 71 formed on opposite sides thereof and further has a one and one half inch hole 77 bored on centerline 53 therethrough from upper surface 70 to bottom surface 71 adapted for receiving gimbal 51 therein.

At assembly, support plate 38 is disposed superior to base mounting plate 50 and secured thereto with #10–24 bolts 52 screwed into threaded holes 54 in base mounting plate 50, bolts 52 disposed through holes 55 in support plate 38 with apices 73 of base mounting plate 50 rotated 60 degrees from leg slots 39, but aligned with apices 68 of support plate 38. Leg slots 39 are thus centrally located along each of sides 69 of base mounting plate 50. Upper surface 70 is adapted to mate with lower surface 67 of support plate 38 and be contiguous therewith and having holes 76, 77 aligned for receiving gimbal 51 therein.

Pivot sleeves 43 are preferably brass, bronze or thermoplastic sleeves having a one quarter inch diameter hole drilled therethrough for receiving leg pin 41 therein. Thus, when assembled to support plate 38, pivot sleeves 43 have line contact with the inside surface 152 of lobes 60 such that legs 37 may freely pivot about leg pins 41. Preferably, end cap 85 is threaded upon pivot end 45 of leg 37 or may be force fit into pivot end 45 by inserting same within bore 97 and frictionally driving end cap 85 thereinto. End cap 85 is preferably a ¾ NPT bronze or brass pipe cap having a one sixteenth inch diameter vent 197 drilled therein which may have vent tube 198 screwed into a threaded opening therein or brazed therein.

Leg pins 41 may be bronze or brass cylindrical pins with a head portion 64 to be received in counter bore 62 but preferably are two inch long hardened steel bolts 61 having head portion 64 and threaded portion 63. Each leg pin 41 is inserted into leg pin hole 40 through one lobe 60, through pivot sleeve 43 in leg 37 having nuts 180 threaded upon threaded portion 63 or alternately, screwed into threaded hole 65 in other lobe 60 of ear 58.

Legs 37 may be formed from circular, square, or triangular steel or aluminum tube but are preferably cut from a length of three quarter inch steel pipe approximately three feet in length from pivot end 45 to deployment surface engaging end 44 having open ends 44, 45 burnished for ease of assembly of end cap 85 and foot 48. Legs 37 are threaded upon both ends with ¾ NPT threads for receiving end caps 85, 188 thereupon. Deployment surface engaging end 44 has a foot 48 inserted thereinto, foot 48 formed from a three eighths inch diameter solid bar of aluminum or steel having a slot 187 cut through the terminal end 199 thereof for receiving toe 49 therein and having opposite end 200 slidably received in bore 97 of leg 37. Shrink fit upon foot 48 is a polytetrafluoroethylene sleeve 183 having an outside diameter equal to the inside diameter of bore 97 and slidably engaged therewith upon assembly. End 200 may further have a polytetrafluoroethylene bushing 183' also the same diameter as bore 97 mounted thereon providing additional support for foot 48. Foot 48 is received in bore 189 of end cap 188 prior to threading end cap 188 upon leg 37. End cap 188 is a ¾ NPT bronze or brass pipe cap having a three eighths inch diameter bore 189 therethrough for receiving foot 48 therein.

End 199 of foot 48 has roll pin holes 186 drilled through intersecting slot 187 centrally therein. Toe 49 is formed in an equilateral triangle from a one sixteenth inch thick steel plate having each side approximately one inch in length. Two of the sides are sharpened terminating in a pointed end 98 adapted for positive engagement with deployment surface 90. Roll pin holes 185 are drilled through toe 49 near the end opposite pointed end 98 for receiving roll pins 181 therein at assembly. Toe 49 thereby penetrates deployment surface 90 establishing a firm base for multiple hazard marker 10. Springs 190 for biasing foot 48 downwardly and for absorbing shock when deployed and spring 168 for biasing flag carrying tube upwardly are conventional compression springs cut to length to provide for the functions hereinbefore described. Foot 48 may alternatively be fashioned from a gas filled shock absorber which is press fit into leg 37 having a rod extending therefrom for attaching toe 49.

Spring coupler 193 is cut from a two inch diameter, one inch thick steel bar stock and formed into an elliptical shape having a shaft hole 194 in the center thereof and torsion spring holes 195 drilled through the thickness thereof centered on the major axis and equidistantly spaced from hole 194 on either side thereof. Shaft hole 194 is approximately the same diameter as outer surface 81 of leg 37 for a loose running fit thereupon. Torsion springs 96 may then be disposed on both sides of leg 37 having one end 201 inserted into spring hole 195 in spring coupler 193. Torsion springs 96 are formed from one eighth inch diameter spring steel wire having one end 201 disposed at a right angle to other end 202 and having at least one full turn therebetween. Spring coupler 193 may then be secured to leg 37 by a set screw through the minor diameter thereof or by press fitting spring coupler 193 thereonto engaging outer surface 81. Thus, leg 37 is biased outwardly upon deployment.

While a single means for deploying 100 has been described above in detail, multiple means for deploying are possible. For instance in FIG. 1, the embodiment shown on the left of deployment vehicle 160 is automated deployment device 165 having multiple means for deploying 100 arranged in a circular fashion about a central point 157 spaced by an angular distance between the center lines 162 of each means for deploying 100 forming a carousel 164 which is employed to deploy a plurality of multiple hazard markers 10, 10A in sequential fashion. Channel 102 of each means for deploying 100 is modified from central point 157 to terminal end 107 by tapering channel 102 to provide for arranging means for deploying 100 in the circular fashion hereinbefore described. Angled support braces 109 are also modified whereby only one support brace 109 is utilized for each cartridge 120 and is adapted to be welded to channel 102 near the mid point thereof with opposite end 115 welded to cartridge 120. Adjacent cartridges are arranged to be contiguous and are welded together along the touching outer periphery 133 providing rigidity to carousel 164. Carousel 164 has a control and drive mechanism 159 to control the rotation thereof and fix each sequential means for deploying 100 in a deployment position approximating the deployment position of the single means for deploying 100 shown on the right side of deployment vehicle 160. Of course, multiple circular rows 163 of means for deploying 100 may be provided for in carousel 164 by reducing the number of means for deploying 100 for each successive inwardly disposed row 163.

Each multiple hazard marker 10, 10A is magnetically coded with an identification number and access code. The command signal impulse actuator 93 will receive an initial signal prior to deployment to initialize the ABC sensors and electronic means for signaling 36. Means for signaling 36 may be set to white (sampling or unknown mode), yellow (low level hazard), red (high level hazard) but should not be set to green (safe) unless the conditions are known. Preferably, means for signaling 36 will be set to yellow signifying caution. Upon deployment of multiple hazard marker 10, 10A onto deployment surface 90 command signal impulse actuator 93 will begin a sampling sequence to determine the presence of ABC hazards and transmit a data stream to remote receivers. Command signal impulse actuator 93 will change the color of means for signaling 36 depending upon the results of the sampling sequence. Personnel at the remote receiver may transmit information to any multiple hazard marker 10, 10A by addressing same with the coded identification number and access code to resubmit sampling data, restart the sampling sequence, change the identification code or access code, change means for signaling or switch of that multiple hazard marker 10, 10A. As each multiple hazard marker 10, 10A is visible from a distance of at least one hundred meters in both day and night conditions, ground based personnel may also access any multiple hazard marker 10, 10A utilizing a small pocket transceiver. Coating 22, 22A of multiple hazard markers 10, 10A may also comprise thermal absorbent material 279, and/or thermal absorbent material 279 may be attached to a portion of legs 37, 37A or mast 18, 18A or both, for nighttime sighting of the multiple hazard marker 10, 10A utilizing night vision goggles. Multiple hazard markers 10, 10A are adapted to be used in hostile environments with temperatures ranging from −20 to 140° F. and winds of 30 mph without turning over and are also adapted to withstand the shock of being dropped from heights of at least 10 ft.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor be limited thereto.

I claim:

1. A field marking system comprising a deployment vehicle, a deployment surface, a plurality of field markers and means to deploy said field markers carried by said deployment vehicle, each said field marker having a means for standing erect upon said deployment surface, a means for visibly marking a location on said deployment surface, a means for visibly signaling the presence of physical hazards, a means for determining the presence of Atomic Biological and Chemical (ABC) hazards and a means for communicating.

2. A field marking system as in claim 1 wherein said means for communicating includes means for receiving radio frequency signals from remote transmitters.

3. A field marking system as in claim 2 wherein at least one of said remote transmitters is associated with said deployment vehicle.

4. A field marking system as in claim 1 wherein said means for visibly marking a location on said deployment surface comprises at least one luminous device.

5. A field marking system as in claim 1 wherein said means for visibly marking a location on said deployment surface comprises signal flags affixed to said marker.

6. A field marking system as in claim 1 wherein said deployment vehicle is a military tank.

7. A field marking system as in claim 6 wherein means to deploy carried by said tank has means to deploy said field markers from either side of said tank.

8. A field marking system as in claim 1 wherein said field markers are deployed seriatim to mark a lane through a hazardous field.

9. A field marking system as in claim 8 wherein said means for visibly marking a location on said deployment surface comprises marking at least one edge of said lane.

10. A field marking system as in claim 1 wherein said means for signaling the presence of said ABC hazards comprises means for changing the color of a luminous device associated with said marker.

11. A field marker as in claim 1 wherein said means for communicating includes a means for visibly signaling the presence of said ABC hazards.

12. A field marking system as in claim 1 wherein said means for communicating comprises means for electronically transmitting toxicity levels of said ABC hazards to remote receivers.

13. A field marking system as in claim 12 wherein at least one of said remote receivers is associated with said deployment vehicle.

14. A field marking system as in claim 1 wherein said means for standing erect on said deployment surface comprises means for engaging said deployment surface.

15. A field marking system as in claim 14 wherein said means for engaging said deployment surface comprises leg elements extending from said marker.

16. A field marker for a field marking system, said field marking system comprising a deployment vehicle, a deployment surface, a plurality of field markers and means to deploy said field markers carried by said deployment vehicle, each said field marker comprising a lower portion, an upper portion and a central portion, said lower portion having means to remain erect when deployed associated therewith, said upper portion having means to mark a position on a field where deployed associated therewith, said central portion having means to expand and means to signal associated therewith, a means to activate associated with said means to signal and a means to transmit associated with said means to activate.

17. A field marker as in claim 16 wherein said means to remain erect when deployed associated with said lower portion comprises a plurality of deployable leg elements.

18. A field marker as in claim 17 wherein said plurality of deployable leg elements are each journaled in a mounting plate in said central portion and extend therefrom.

19. A field marker as in claim 13 wherein said leg elements have ground engaging pointed toes for firmly engaging said deployment surface.

20. A field marking system comprising a deployment vehicle, a deployment surface, a plurality of field markers and means to deploy said field markers carried by said deployment vehicle, each said field marker having a means for standing erect upon said deployment surface, a means for visibly marking a location on said deployment surface, a means for visibly signaling the presence of physical hazards, a means for determining the presence of Atomic, Biological and Chemical hazards and a means for communicating wherein said means to deploy comprises means to collapse said field marker, means to retain said field marker and means to release said field marker.

* * * * *